United States Patent
Yagci et al.

(10) Patent No.: US 12,498,298 B2
(45) Date of Patent: Dec. 16, 2025

(54) AUTOMATED TISSUE SECTION SYSTEM WITH CUT QUALITY PREDICTION

(71) Applicant: Clarapath, Inc., Hawthorne, NY (US)

(72) Inventors: Baris Yagci, Montclair, NY (US); Steven Smith, Hawthorne, NY (US); Partha P. Mitra, New York, NY (US)

(73) Assignee: Clarapath, Inc., Hawthorne, NY (US)

( * ) Notice: Subject to any disclaimer, the term of this patent is extended or adjusted under 35 U.S.C. 154(b) by 404 days.

(21) Appl. No.: 18/085,383

(22) Filed: Dec. 20, 2022

(65) Prior Publication Data

US 2023/0228651 A1 Jul. 20, 2023

Related U.S. Application Data

(60) Provisional application No. 63/265,747, filed on Dec. 20, 2021.

(51) Int. Cl.
*G01N 1/06* (2006.01)
*G06T 7/00* (2017.01)

(52) U.S. Cl.
CPC ............. *G01N 1/06* (2013.01); *G06T 7/0012* (2013.01); *G01N 2001/068* (2013.01); *G06T 2207/10016* (2013.01); *G06T 2207/30004* (2013.01)

(58) Field of Classification Search
CPC .. G01N 1/06; G01N 2001/068; G06T 7/0012; G06T 2207/10016; G06T 2207/30004; B26D 1/02; B26D 3/28; B26D 7/0616; B26D 7/088; B26D 7/08
See application file for complete search history.

(56) References Cited

U.S. PATENT DOCUMENTS

| | | |
|---|---|---|
| 4,511,224 A | 4/1985 | Sitte et al. |
| 5,746,855 A | 5/1998 | Bolles |
| 6,387,653 B1 | 5/2002 | Voneiff et al. |
| 6,568,307 B1 | 5/2003 | Gunther |
| 6,720,191 B1 | 4/2004 | Goldstein et al. |

(Continued)

FOREIGN PATENT DOCUMENTS

| | | |
|---|---|---|
| CN | 212115045 U | 12/2020 |
| DE | 102011116555 A1 | 4/2013 |

(Continued)

OTHER PUBLICATIONS

International Search Report in PCT International Application No. PCT/US2022/082067 mailed Jun. 6, 2023.

*Primary Examiner* — Siamak Harandi
(74) *Attorney, Agent, or Firm* — Greenberg Traurig, LLP; Roman Fayerberg; Richard Brooks

(57) ABSTRACT

A sectioning system includes a chuck assembly configured to receive a tissue block, a cutting assembly configured to remove a tissue section from the tissue block, at least one sensor configured to sense data regarding dynamics of one or more components of at least one of the chuck assembly or the cutting assembly, and a control system. The control system is configured to receive data from the at least one sensor, determine whether the data from the at least one sensor shows normal behavior of the one or more components of at least one of the chuck assembly or the cutting assembly, and output a signal if it is determined the data from the at least one sensor does not show normal behavior of the one or more components.

20 Claims, 16 Drawing Sheets

(56) References Cited

U.S. PATENT DOCUMENTS

| | | |
|---|---|---|
| 7,374,907 B1 | 5/2008 | Voneiff et al. |
| 8,074,547 B2 | 12/2011 | Ito et al. |
| 8,687,858 B2 | 4/2014 | Walter et al. |
| 9,032,854 B2 | 5/2015 | Yang et al. |
| 9,164,014 B2 | 10/2015 | Ito |
| 9,279,749 B2 | 3/2016 | Donovan et al. |
| 9,354,147 B2 | 5/2016 | Lefebvre |
| 9,488,552 B2* | 11/2016 | Whited .................. G01N 1/286 |
| 9,933,339 B2 | 4/2018 | Briggman |
| 10,228,311 B2 | 3/2019 | Stephens et al. |
| 10,473,557 B2 | 11/2019 | Mitra et al. |
| 10,571,368 B2 | 2/2020 | Zhang et al. |
| 10,724,929 B2 | 7/2020 | Zhang et al. |
| 11,169,056 B2 | 11/2021 | Mitra et al. |
| 11,435,268 B2 | 9/2022 | Mitra et al. |
| 11,467,071 B2 | 10/2022 | Mitra et al. |
| 11,506,577 B2 | 11/2022 | Zhang et al. |
| 11,609,162 B2 | 3/2023 | Mitra et al. |
| 11,630,035 B2 | 4/2023 | Mitra et al. |
| 11,821,826 B2 | 11/2023 | Mitra et al. |
| 11,874,208 B2 | 1/2024 | Mitra et al. |
| 11,898,948 B2 | 2/2024 | Mitra et al. |
| 11,959,835 B2 | 4/2024 | Mitra et al. |
| 12,158,404 B2 | 12/2024 | Mitra et al. |
| 12,292,360 B2 | 5/2025 | Mitra et al. |
| 2003/0022271 A1 | 1/2003 | Voneiff et al. |
| 2003/0120633 A1 | 6/2003 | Torre-Bueno |
| 2004/0011020 A1* | 1/2004 | Nomura .................. F02C 9/52 60/725 |
| 2005/0126311 A1 | 6/2005 | Miyazawa et al. |
| 2005/0235542 A1 | 10/2005 | Metzner et al. |
| 2006/0086221 A1 | 4/2006 | Kong |
| 2007/0039435 A1 | 2/2007 | Kokubo |
| 2007/0141711 A1 | 6/2007 | Stephens et al. |
| 2007/0180965 A1 | 8/2007 | Ito et al. |
| 2007/0199418 A1 | 8/2007 | Ito |
| 2009/0110253 A1 | 4/2009 | Torre-Bueno |
| 2009/0214088 A1 | 8/2009 | Sorenson et al. |
| 2010/0021037 A1 | 1/2010 | Zahniser et al. |
| 2010/0093022 A1 | 4/2010 | Hayworth et al. |
| 2010/0118133 A1 | 5/2010 | Walter et al. |
| 2010/0279342 A1 | 11/2010 | Kijima et al. |
| 2011/0111435 A1 | 5/2011 | Dobson et al. |
| 2011/0249109 A1 | 10/2011 | Fine |
| 2011/0303352 A1 | 12/2011 | Nakajima et al. |
| 2012/0149050 A1 | 6/2012 | Lapen et al. |
| 2013/0164781 A1 | 6/2013 | Lefebvre |
| 2014/0026683 A1 | 1/2014 | Hayworth et al. |
| 2014/0041500 A1 | 2/2014 | Isagawa et al. |
| 2014/0051158 A1 | 2/2014 | Nakajima et al. |
| 2014/0098376 A1 | 4/2014 | Hashimshony |
| 2014/0137715 A1 | 5/2014 | Sneyders et al. |
| 2015/0013512 A1 | 1/2015 | Yang et al. |
| 2015/0268141 A1 | 9/2015 | Miyatani |
| 2015/0293026 A1 | 10/2015 | Shin et al. |
| 2016/0063724 A1 | 3/2016 | Tunstall et al. |
| 2016/0091400 A1 | 3/2016 | Whited et al. |
| 2016/0139004 A1 | 5/2016 | Witte |
| 2016/0245833 A1 | 8/2016 | Lefebvre |
| 2017/0003309 A1 | 1/2017 | Mitra et al. |
| 2017/0067800 A1 | 3/2017 | Briggman |
| 2017/0161428 A1 | 6/2017 | Mitra |
| 2017/0205317 A1 | 7/2017 | Zhang et al. |
| 2017/0276574 A1* | 9/2017 | Webber .................. G01N 1/06 |
| 2017/0328818 A1 | 11/2017 | Zhang et al. |
| 2017/0372471 A1 | 12/2017 | Euren |
| 2018/0108163 A1 | 4/2018 | Remiszewski |
| 2018/0136089 A1 | 5/2018 | Bui et al. |
| 2019/0176194 A1 | 6/2019 | Chen et al. |
| 2019/0250071 A1 | 8/2019 | Hayworth et al. |
| 2019/0301980 A1 | 10/2019 | Anderson et al. |
| 2019/0355135 A1 | 11/2019 | Rhodes |
| 2019/0368982 A1 | 12/2019 | Schleifer et al. |
| 2020/0041387 A1 | 2/2020 | Rhodes et al. |
| 2020/0064232 A1 | 2/2020 | Mitra et al. |
| 2020/0160522 A1 | 5/2020 | Merlo et al. |
| 2020/0166434 A1 | 5/2020 | Zhang et al. |
| 2020/0388032 A1 | 12/2020 | Chiang et al. |
| 2021/0149174 A1 | 5/2021 | Levenson |
| 2021/0262905 A1 | 8/2021 | Mitra et al. |
| 2021/0262907 A1 | 8/2021 | Mitra et al. |
| 2021/0263055 A1 | 8/2021 | Mitra et al. |
| 2021/0323150 A1* | 10/2021 | Cho ..................... G06V 20/50 |
| 2022/0034768 A1 | 2/2022 | Mitra et al. |
| 2022/0034769 A1 | 2/2022 | Mitra et al. |
| 2022/0042887 A1 | 2/2022 | Mitra et al. |
| 2022/0113228 A1 | 4/2022 | Mitra et al. |
| 2022/0128810 A1 | 4/2022 | Mitra et al. |
| 2022/0349788 A1 | 11/2022 | Mitra et al. |
| 2022/0364960 A1 | 11/2022 | Smith et al. |
| 2022/0404241 A1 | 12/2022 | Yagci et al. |
| 2023/0057075 A1 | 2/2023 | Zhang et al. |
| 2023/0126618 A1 | 4/2023 | Mitra et al. |
| 2023/0221222 A1 | 7/2023 | Mitra et al. |
| 2023/0359010 A1 | 11/2023 | Chen et al. |
| 2024/0167917 A1 | 5/2024 | Mitra et al. |
| 2024/0288342 A1 | 8/2024 | Mitra et al. |
| 2025/0146914 A1 | 5/2025 | Mitra et al. |

FOREIGN PATENT DOCUMENTS

| | | |
|---|---|---|
| DE | 10207118304 A1 | 2/2018 |
| EP | 011290 A2 | 6/1984 |
| JP | S6385426 A | 4/1988 |
| JP | 2000190291 A | 7/2000 |
| JP | 2001324423 A | 11/2001 |
| JP | 2004013435 A | 1/2004 |
| JP | 2008020293 A | 1/2008 |
| JP | 2012229993 A | 11/2012 |
| JP | 2012229995 A | 11/2012 |
| JP | 2007218616 A | 1/2015 |
| WO | 1997003827 A1 | 2/1997 |
| WO | WO 2010151761 A2 | 12/2010 |
| WO | WO 2012147730 A1 | 11/2012 |
| WO | WO 2015046518 A1 | 4/2015 |
| WO | WO 2015175525 A1 | 11/2015 |
| WO | 2019209743 A1 | 10/2019 |
| WO | WO-2021096950 A1 * | 5/2021 |
| WO | WO 2021168457 A1 | 8/2021 |
| WO | WO 2022087443 A1 | 4/2022 |
| WO | 2022241261 A1 | 11/2022 |
| WO | 2022271732 A1 | 12/2022 |
| WO | 2023092156 A1 | 5/2023 |
| WO | 2023122620 A2 | 6/2023 |

\* cited by examiner

AUTOMATED TISSUE SECTION SYSTEM WITH CUT QUALITY PREDICTION

CROSS-REFERENCE TO RELATED APPLICATIONS

This application claims the benefit of and priority to U.S. Provisional Patent Application No. 63/265,747, filed Dec. 20, 2021, and the contents of this application are incorporated herein by reference in their entirety.

FIELD

The present disclosure relates to automated systems and methods for sectioning tissue from biological tissue blocks, and, more particularly, to systems and methods providing prediction of cut quality of a microtome.

BACKGROUND

Traditional microtomy, the production of micron-thin tissue sections for microscope viewing, is a delicate, time consuming manual task. Recent advancements in the digital imaging of tissue sample sections have made it desirable to slice blocks of specimen very quickly. By way of example, where tissues are sectioned as part of clinical care, time is an important variable in improving patient care. Every minute that can be saved during sectioning of tissue for intra-operative applications of anatomic pathology, for example in examining margins of lung cancers to determine whether enough tissue has been removed, is of clinical value. To create a large number of sample sections quickly, it is desirable to automate the process of cutting tissue sections from the supporting tissue block by a microtome blade and facilitating the transfer of cut tissue sections to slides.

Every minute that can be saved during sectioning of tissue for intra-operative applications of anatomic pathology, can be critical. Poor cut quality of the sectioned tissue can slow the process while an operator, or lab worker, is attempting to determine the underlying source of the poor cut quality. It would be advantageous to provide an automated system which can increase the predictability of at least one source of poor cut quality, thereby saving time.

SUMMARY

There is a need for improvements of systems and methods for preparation of tissue samples. The present disclosure is directed toward solutions to address this need, in addition to having other desirable characteristics.

The present disclosure relates to a sectioning system including: a chuck assembly configured to receive a tissue block; a cutting assembly configured to remove a tissue section from the tissue block; at least one sensor configured to sense data regarding dynamics of one or more components of at least one of the chuck assembly or the cutting assembly; and a control system configured to: receive data from the at least one sensor; determine whether the data from the at least one sensor shows normal behavior of the one or more components of at least one of the chuck assembly or the cutting assembly; and output a signal if it is determined the data from the at least one sensor does not show normal behavior of the one or more components. In some embodiments, the present disclosure relates to a sectioning system wherein the signal is a control signal to one or more components of at least one of the chuck assembly or the cutting assembly to adjust an operational parameter of the one or more components. In some embodiments, the present disclosure relates to a sectioning system wherein the signal is an alert to a user. In some embodiments, the present disclosure relates to a sectioning system wherein the signal is a control signal to suspend operation of the sectioning system. In some embodiments, the present disclosure relates to a sectioning system wherein the control system is configured to: receive the data from the at least one sensor; and determine the data does not show normal behavior of the one or more components when the data exceeds a predefined limit of baseline data indicative of normal behavior of the one or more components. In some embodiments, the present disclosure relates to a sectioning system wherein the control system is configured to determine if the dynamics of the one or more components exceed a predetermined threshold within a chosen frequency band; and output a signal to rectify a source of the dynamics that exceed the predetermined threshold. In some embodiments, the present disclosure relates to a sectioning system wherein the at least one sensor is a camera including an image sensor configured to capture at least one of a still image, video, or high speed image, and the data includes at least one of a still image, video, or high speed image. In some embodiments, the present disclosure relates to a sectioning system further including: a motor configured to excite at least one of the chuck assembly or the cutting assembly with a predefined vibration signal, wherein the control system is configured to measure data with the at least one sensor to obtain baseline data of at least one of the chuck assembly or the cutting assembly. In some embodiments, the present disclosure relates to a sectioning system wherein the at least one sensor is one or more of an image sensor, a video sensor, a highspeed image sensor, a laser Doppler vibrometer, an acoustic sensor, or a force-based sensor. In some embodiments, the present disclosure relates to a sectioning system wherein the at least one sensor is configured to capture images or a live feed image data to monitor performance of the sectioning system as a function of the images or live feed image data and the control system is configured to adjust an operational parameter of at least one of the chuck assembly or the cutting assembly as a function of the images or the live feed image data. In some embodiments, the present disclosure relates to a sectioning system wherein the at least one sensor is an image sensor, and the sectioning system further includes an illumination system that provides illumination at various wavelengths to capture, by the image sensor, images or live feed data, and the control system is configured to monitor performance of the sectioning system as a function of the images or live feed data. In some embodiments, the present disclosure relates to a sectioning system wherein: the at least one sensor is disposed on, or in communication with, the cutting assembly; and the control system is configured to monitor cutting assembly condition as a function of data from the at least one sensor. In some embodiments, the present disclosure relates to a sectioning system wherein the control system is further configured to predict tissue section quality as a function of the monitored cutting assembly condition. In some embodiments, the present disclosure relates to a sectioning system further including: an imaging system including a lens and an imaging sensor, the imaging sensor being configured to capture images and the control system being configured to analyze the images for blade artifacts and tissue section thickness uniformity. In some embodiments, the present disclosure relates to a sectioning system wherein the control system is configured to alter dynamic parameters and configuration of at least one of the chuck assembly or the cutting assembly, without user intervention, to compensate for drifting microtome conditions monitored from the data from the at least one sensor. In some embodiments, the present disclosure relates to a sectioning system wherein the at least one sensor includes a camera including a lens and a sensor, the sensor is configured to capture images or live feed data, and the control system is configured to predict tissue section quality as a function of the images or the live feed data. In some embodiments, the present disclosure relates to a sectioning system further including an illumination system configured to illuminate at least one of the chuck assembly or the cutting assembly at various wavelengths, wherein the controller is configured to monitor cutting assembly condition without user intervention.

The present disclosure relates to a sectioning system including: a tissue chuck configured to retain a tissue block therein; a blade configured to cut tissue sections from the tissue block; at least one sensor configured to sense dynamics of at least one of the tissue chuck or the blade; and a control system configured to: receive sensed data from the at least one sensor; determine whether the sensed data exceeds a predefined limit of baseline data; and output a signal if it is determined the sensed data exceeds the predefined limit of baseline data.

In some embodiments, the present disclosure relates to a sectioning system wherein the signal includes at least one of an alert to a user, a control signal to suspend operation of the sectioning system, or a control signal to adjust an operational parameter of the sectioning system. In some embodiments, the present disclosure relates to a sectioning system wherein: the at least one sensor includes a camera; the camera includes a lens and a sensor that captures images or a live feed image data to monitor tissue section thickness in real time; and the control system is configured to adjust an operational parameter of the sectioning system as a function of the images or the live feed image data. In some embodiments, the present disclosure relates to a sectioning system wherein: the at least one sensor includes a camera; the camera includes a lens, a sensor, and a dedicated illumination system that provides illumination at various wavelengths to capture images or live feed data; and the control system is configured to monitor performance of the sectioning system as a function of the images or live feed data. In some embodiments, the present disclosure relates to a sectioning system wherein: the at least one sensor includes a force sensor; the force sensor is configured to collect vibration data from the sectioning system; and the control system is configured to monitor performance of the sectioning system as a function of the vibration data. In some embodiments, the present disclosure relates to a sectioning system wherein: the at least one sensor includes a laser Doppler vibrometer; the laser Doppler vibrometer is configured to collect vibration data from the sectioning system; and the control system is configured to monitor performance of the sectioning system as a function of the vibration data.

The present disclosure relates to a sectioning system including: at least one sensor configured to sense data regarding dynamics of one or more components of at least one of a chuck assembly or a cutting assembly, wherein the chuck assembly is configured to receive a tissue block, and wherein the cutting assembly is configured to remove a tissue section from the tissue block; and a controller in communication with the at least one sensor and configured to: receive data from the at least one sensor; determine whether the data from the at least one sensor shows normal behavior of the one or more components of at least one of the chuck assembly or the cutting assembly; and output a signal if it is determined the data from the at least one sensor does not show normal behavior of the one or more components.

In some embodiments, the present disclosure relates to a sectioning system wherein the signal is a control signal to one or more components of at least one of the chuck assembly or the cutting assembly to adjust an operational parameter of the one or more components. In some embodiments, the present disclosure relates to a sectioning system wherein the signal is an alert to a user. In some embodiments, the present disclosure relates to a sectioning system wherein the signal is a control signal to suspend operation of the sectioning system. In some embodiments, the present disclosure relates to a sectioning system wherein the controller is further configured to determine the data does not show normal behavior of the one or more components when the data exceeds a predefined limit of baseline data indicative of normal behavior of the one or more components. In some embodiments, the present disclosure relates to a sectioning system wherein the controller is further configured to: determine if the dynamics of the one or more components exceed a predetermined threshold within a chosen frequency band; and output a signal to rectify a source of the dynamics that exceed the predetermined threshold. In some embodiments, the present disclosure relates to a sectioning system wherein the at least one sensor is a camera including an image sensor configured to capture at least one of a still image, video, or high speed image, and the data includes at least one of a still image, video, or high speed image. In some embodiments, the present disclosure relates to a sectioning system wherein the controller is further configured to: actuate a motor to excite at least one of the chuck assembly or the cutting assembly with a predefined vibration signal; and measure data with the at least one sensor to obtain baseline data of at least one of the chuck assembly or the cutting assembly. In some embodiments, the present disclosure relates to a sectioning system wherein the at least one sensor is one or more of an image sensor, a video sensor, a highspeed image sensor, a laser Doppler vibrometer, an acoustic sensor, or a force-based sensor. In some embodiments, the present disclosure relates to a sectioning system wherein: the at least one sensor is configured to capture images or a live feed image data to monitor performance of the sectioning system as a function of the images or live feed image data; and the controller is configured to adjust an operational parameter of at least one of the chuck assembly or the cutting assembly as a function of the images or the live feed image data. In some embodiments, the present disclosure relates to a sectioning system wherein: the at least one sensor is an image sensor; and the controller is further configured to: control an illumination system to provide illumination at various wavelengths to capture, by the image sensor, images or live feed data; and monitor performance of the sectioning system as a function of the images or live feed data.

The present disclosure relates to a method including: receiving a tissue block within a chuck assembly; removing a tissue section from the tissue block with a cutting assembly; sensing, with at least one sensor, data regarding dynamics of one or more components of at least one of the chuck assembly or the cutting assembly during removal of the tissue section from the tissue block; sending, by the at least one sensor, the sensed data to a controller; determining, by the controller, whether the sensed data from the at least one sensor shows normal behavior of the one or more components of at least one of the chuck assembly or the cutting assembly; and outputting, by the controller, a signal if it is determined the data from the at least one sensor does not show normal behavior of the one or more components.

In some embodiments, the present disclosure relates to a method further including: determining, by the controller, whether the sensed data from the at least one sensor shows conditions of the one or more components of at least one of the chuck assembly or the cutting assembly drifting from normal behavior; and outputting, by the controller, a signal if it is determined the data from the at least one sensor shows conditions of the one or more components of at least one of the chuck assembly or the cutting assembly drifting from normal behavior. In some embodiments, the present disclosure relates to a method wherein the determining further includes comparing, by the controller, the sensed data to baseline data, wherein the baseline data is indicative of normal behavior of the one or more components. In some embodiments, the present disclosure relates to a method wherein the signal is a control signal to one or more components of at least one of the chuck assembly or the cutting assembly to adjust an operational parameter of the one or more components. In some embodiments, the present disclosure relates to a method further including: determining, by the controller, one or more components of at least one of the chuck assembly or the cutting assembly causing at least one of the chuck assembly or the cutting assembly to not show normal behavior; and outputting, by the controller, a control signal to the one or more components causing at least one of the chuck assembly or the cutting assembly to not show normal behavior to adjust an operational parameter of the one or more components. In some embodiments, the present disclosure relates to a method further including: determining, by the controller, one or more components of at least one of the chuck assembly or the cutting assembly causing at least one of the chuck assembly or the cutting assembly to not show normal behavior; and outputting, by the controller, a control signal to another one or more components of at least one of the chuck assembly or the cutting assembly to adjust an operational parameter of the another one or more components. In some embodiments, the present disclosure relates to a method wherein the signal is an alert to a user. In some embodiments, the present disclosure relates to a method wherein the signal is a control signal to cease operation of a sectioning system including the chuck assembly and the cutting assembly. In some embodiments, the present disclosure relates to a method further including: determining, by the controller, baseline data indicative of normal behavior of the one or more components, wherein determining whether the sensed data from the at least one sensor shows normal behavior of the one or more components of at least one of the chuck assembly or the cutting assembly further includes comparing, by the controller, the sensed data to the baseline data.

The present disclosure relates to a method including: receiving, by a controller, data sensed with at least one sensor, wherein: the sensed data relates to dynamics of one or more components of at least one of a chuck assembly or a cutting assembly; wherein the chuck assembly is configured to receive a tissue block; and the cutting assembly is configured to remove a tissue section from the tissue block; determining, by the controller, whether the sensed data from the at least one sensor shows normal behavior of the one or more components of at least one of the chuck assembly or the cutting assembly; and outputting, by the controller, a signal if it is determined the data from the at least one sensor does not show normal behavior of the one or more components.

In some embodiments, the present disclosure relates to a method further including: determining, by the controller, whether the sensed data from the at least one sensor shows conditions of the one or more components of at least one of the chuck assembly or the cutting assembly drifting from normal behavior; and outputting, by the controller, a signal if it is determined the data from the at least one sensor shows conditions of the one or more components of at least one of the chuck assembly or the cutting assembly drifting from normal behavior. In some embodiments, the present disclosure relates to a method wherein the determining further includes comparing, by the controller, the sensed data to baseline data, wherein the baseline data is indicative of normal behavior of the one or more components. In some embodiments, the present disclosure relates to a method wherein the signal is a control signal to one or more components of at least one of the chuck assembly or the cutting assembly to adjust an operational parameter of the one or more components. In some embodiments, the present disclosure relates to a method further including: determining, by the controller, one or more components of at least one of the chuck assembly or the cutting assembly causing at least one of the chuck assembly or the cutting assembly to not show normal behavior; and outputting, by the controller, a control signal to the one or more components causing at least one of the chuck assembly or the cutting assembly to not show normal behavior to adjust an operational parameter of the one or more components. In some embodiments, the present disclosure relates to a method further including: determining, by the controller, one or more components of at least one of the chuck assembly or the cutting assembly causing at least one of the chuck assembly or the cutting assembly to not show normal behavior; and outputting, by the controller, a control signal to another one or more components of at least one of the chuck assembly or the cutting assembly to adjust an operational parameter of the another one or more component. In some embodiments, the present disclosure relates to a method wherein the signal is an alert to a user. In some embodiments, the present disclosure relates to a method wherein the signal is a control signal to cease operation of a sectioning system including the chuck assembly and the cutting assembly. In some embodiments, the present disclosure relates to a method further including: determining, by the controller, baseline data, wherein: the baseline data is indicative of normal behavior of the one or more components; and determining whether the sensed data from the at least one sensor shows normal behavior of the one or more components of at least one of the chuck assembly or the cutting assembly further includes comparing, by the controller, the sensed data to the baseline data.

These and other embodiments of the present disclosure are described in more detail below.

BRIEF DESCRIPTION OF DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

Figure 1A:
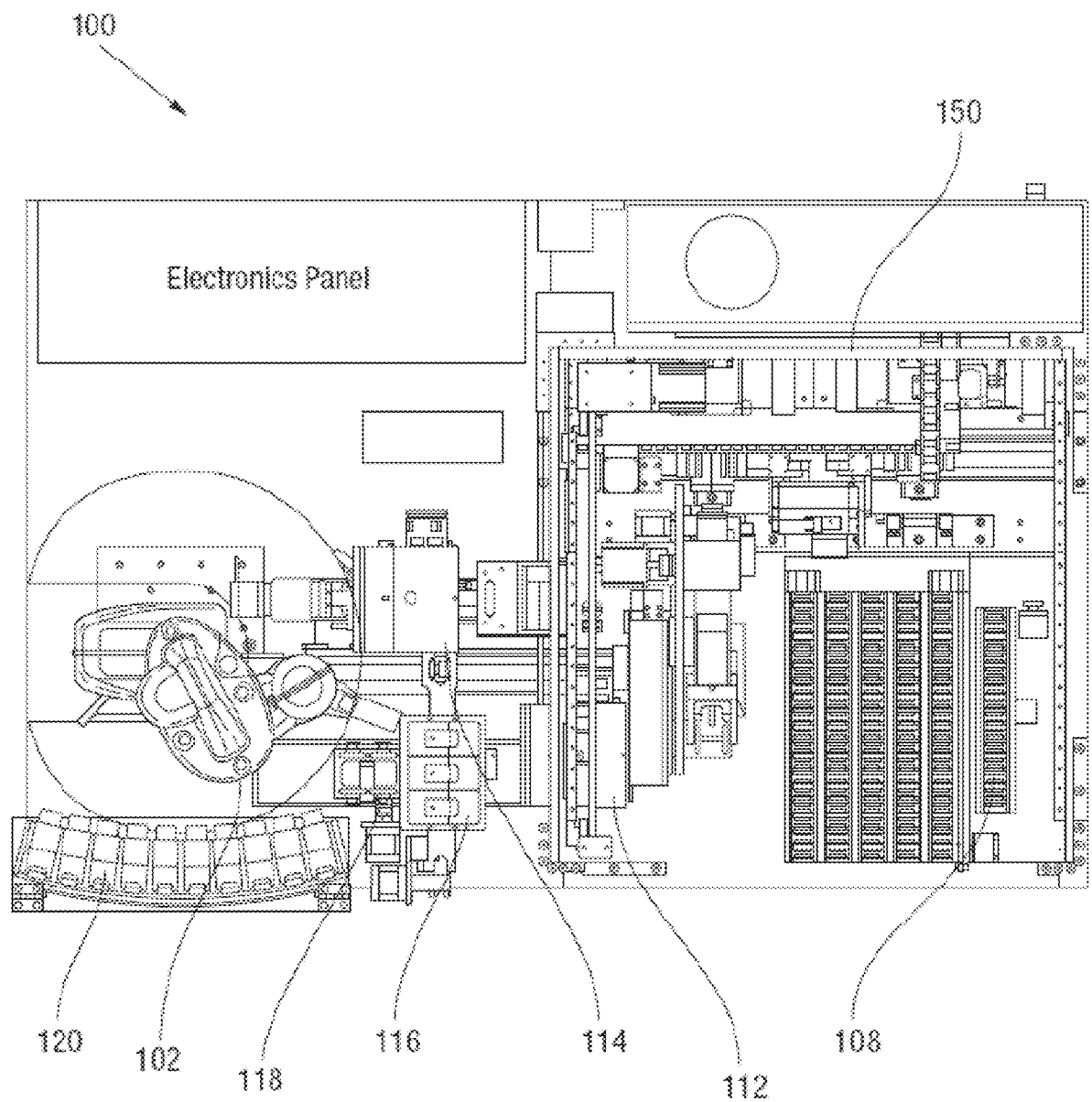
FIG. 1A is an above view illustration of a sample system layout in accordance with some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to systems and methods for processing tissue blocks containing biological samples of tissue. The processing can include automated systems designed to face tissue blocks and cut tissue sections from the tissue block using one or more microtomes. The cut tissue sections can be transferred to a transfer/transport medium such as tape and then, from the transfer medium to slides for pathology or histology examination. The presently disclosed methods and systems may be employed in connection with manual as well as automated microtomy methods and systems.

The present disclosure further provides methods and systems for enhanced prediction of fault in a microtome based on, for example, physical measurements. In some embodiments, the physical measurements can be determined from data from sensors located on the microtome, or sensors monitoring the microtome itself. In some embodiments, the sensors may be on the chuck holding the tissue block.

The present disclosure relates to systems and methods for identifying and/or predicting fault in a microtome, or sectioning system. In some embodiments, one or more sensors collect data on one or more components of the microtome. The one or more components may be a chuck or other portion of a chuck assembly of the microtome. The one or more components may be a blade, blade holder, or other portion of a cutting assembly of the microtome. In some embodiments, the one or more sensors collect data on a tissue block received in the tissue chuck. In some embodiments, the one or more sensors can collect data on the static orientation of the tissue block, portion of the cutting assembly, or portion of the chuck assembly. In some embodiments, the one or more sensors can collect data on the dynamics of the tissue block, portion of the cutting assembly, or portion of the chuck assembly. Dynamics, as used herein, can refer to force, position, velocity, and/or acceleration at one or more points in time, and/or changes in any of the force, position, velocity, and/or acceleration over time, for instance. In some embodiments, the one or more sensors can collect data, such as thickness, on a tissue section cut by the microtome. The collected data can be compared to baseline data. The baseline data is generally data on the operation of the microtome in a normal state. The microtome is in a normal state, for instance, when all components are fastened together according to design requirements of the microtome. That is, the baseline data relates to an expected orientation or dynamics of one or more components of the microtome or tissue block when the microtome is operated in a normal physical state. The baseline data can relate to a tissue section quality (e.g. thickness) cut with a normal microtome (i.e. a microtome in a normal state or operating under normal conditions). In some embodiments, the sensors can collect data during standard operation of the microtome (i.e. as the microtome is being used to section a tissue block). In some embodiments, the microtome can be deliberately excited (e.g. vibrated or otherwise moved for the purpose of collecting data), and the sensors can collect data during excitation of the microtome.

The collected data can be analyzed and compared to the baseline data. If the collected data matches, or is within the limits defined by, the baseline data, it can be determined that the microtome is in a normal condition. If the collected data deviates from the baseline data (e.g. exceeds a limit defined by the baseline data), it can be determined that the microtome is not operating in a normal state. The microtome may not be in a normal state when one or more components of the chuck assembly and/or cutting assembly are loose or otherwise damaged, for instance. Tissue section quality may deteriorate when the microtome is operating outside of normal behavior. If the microtome is determined not to be in a normal state, the system can output a signal. In some embodiments, the particular cause of the microtome not being in a normal state (e.g. the particular component that is loose) can be identified, and the signal can be to actuate (e.g. tighten) the one or more identified components, causing the microtome to return to a normal operating state. In some embodiments, the particular cause of the microtome not being in a normal state (e.g. the particular component that is loose) can be identified, and the signal can be to actuate one or more other components to account for the behavior of the identified, faulty component (e.g. change the operation of the blade holder to account for a fault in the blade) to return the microtome to a normal operating state. In some embodiments, the signal can be to suspend operation of the microtome. In some embodiments, the signal can be an alert to a user. The alert can inform the user that manual intervention is needed to return the microtome to a normal operating state.

Figure 1B:
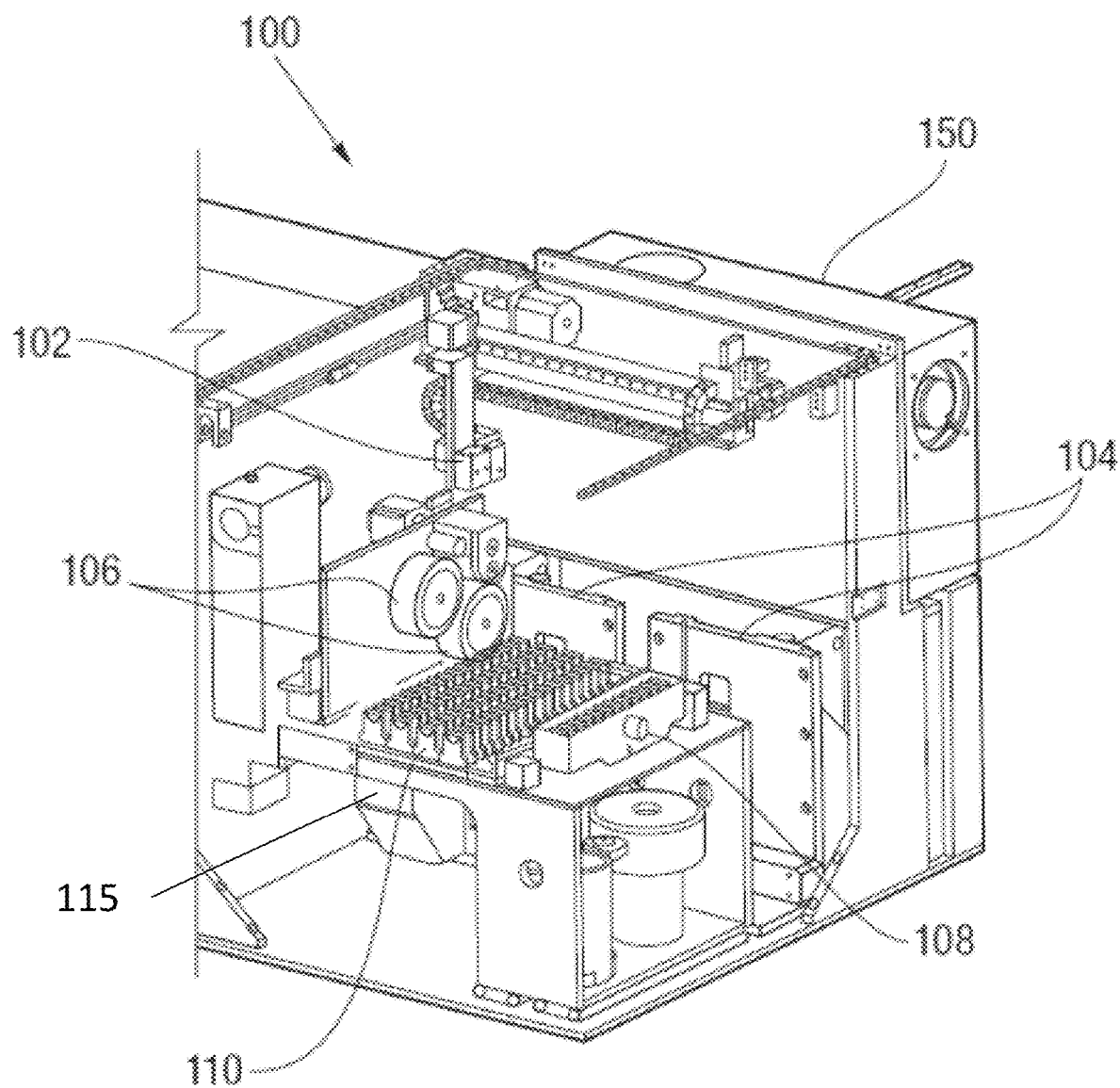
FIG. 1B and FIG. 1C are isometric view illustrations of a sample system layout in accordance with some embodiments of the present disclosure.
Figure 1C:
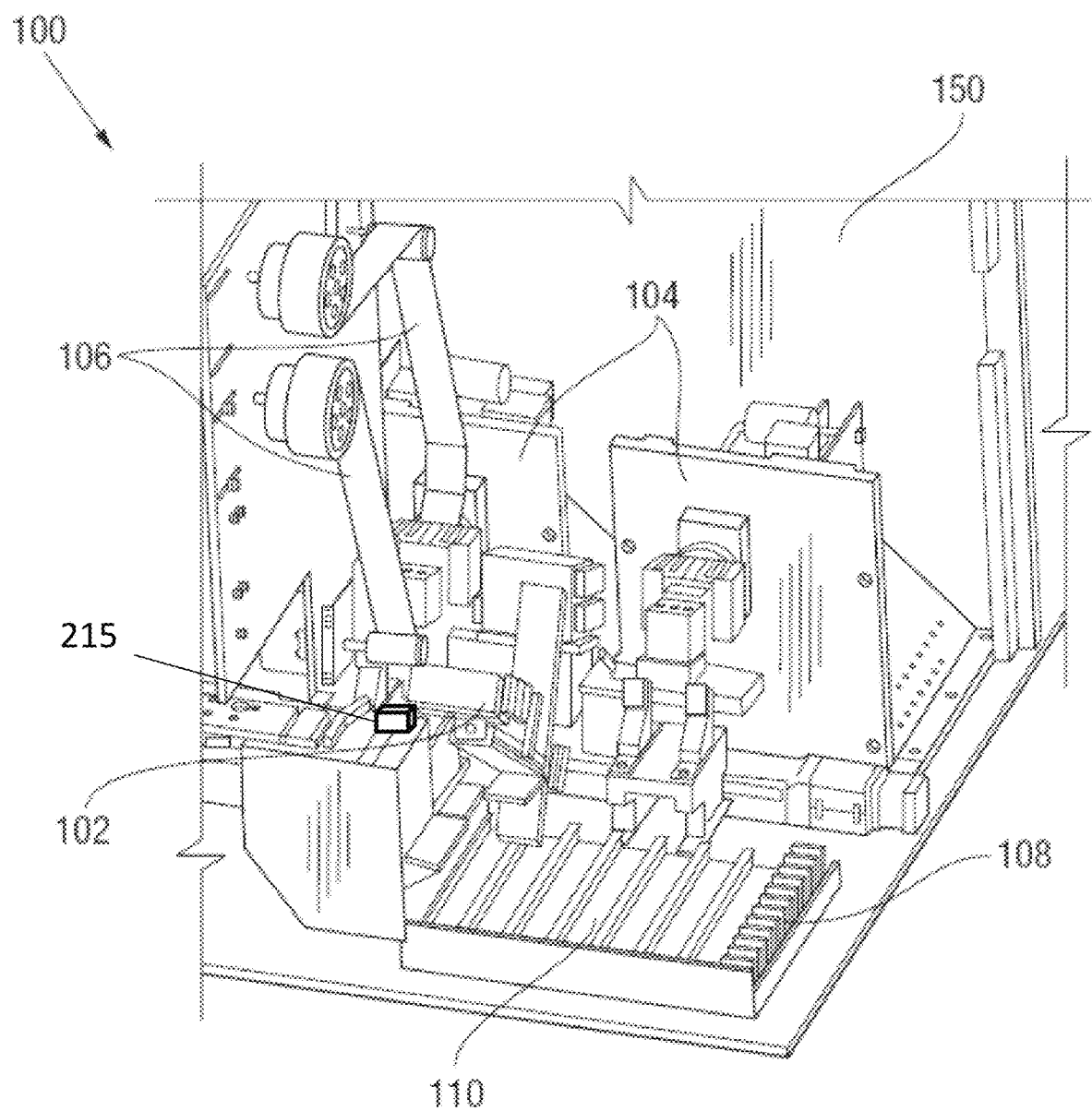
Figure 2A:
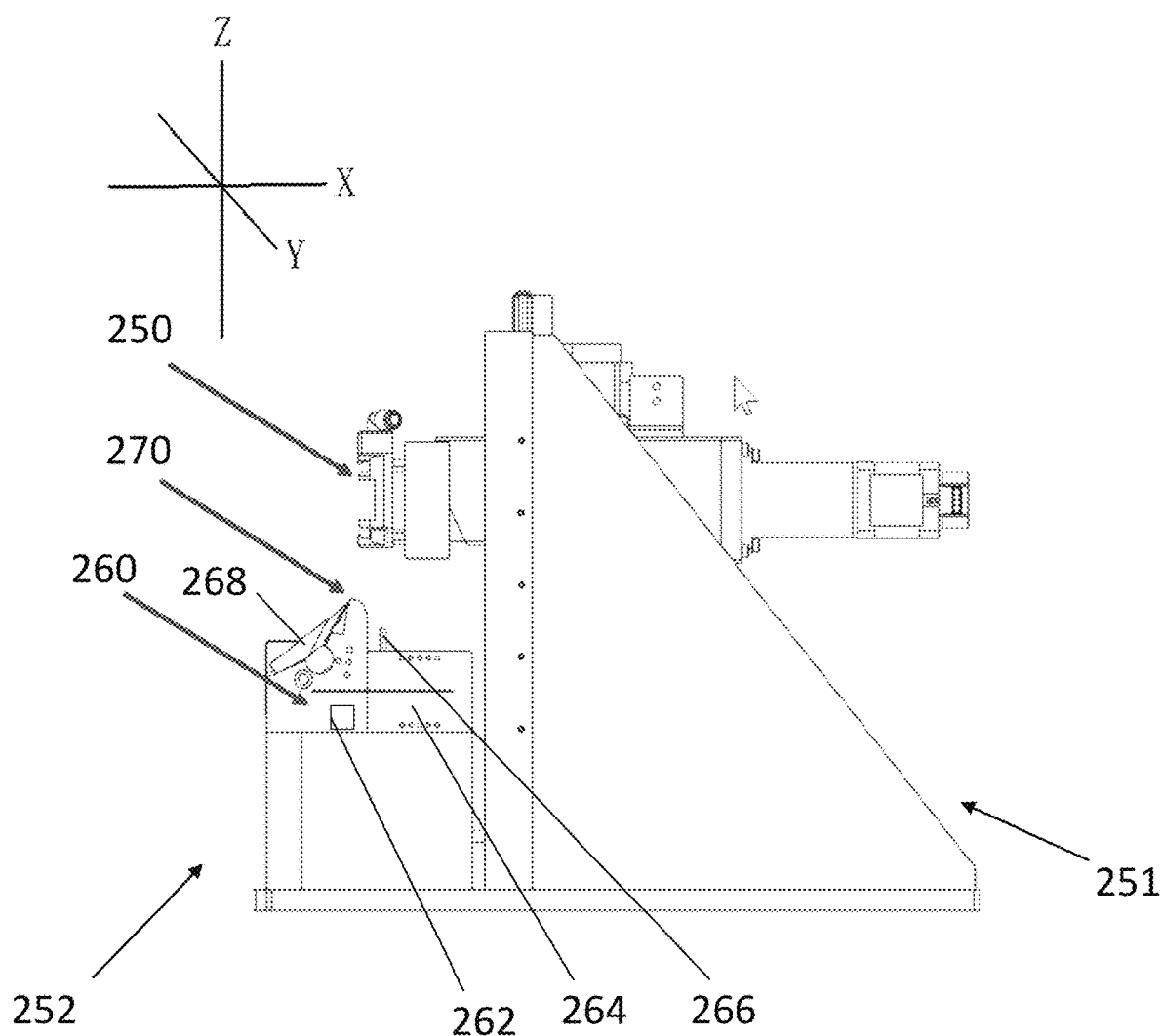
FIG. 2A is a side view illustration of a sample system layout in accordance with some embodiments of the present disclosure.
Figure 2B:
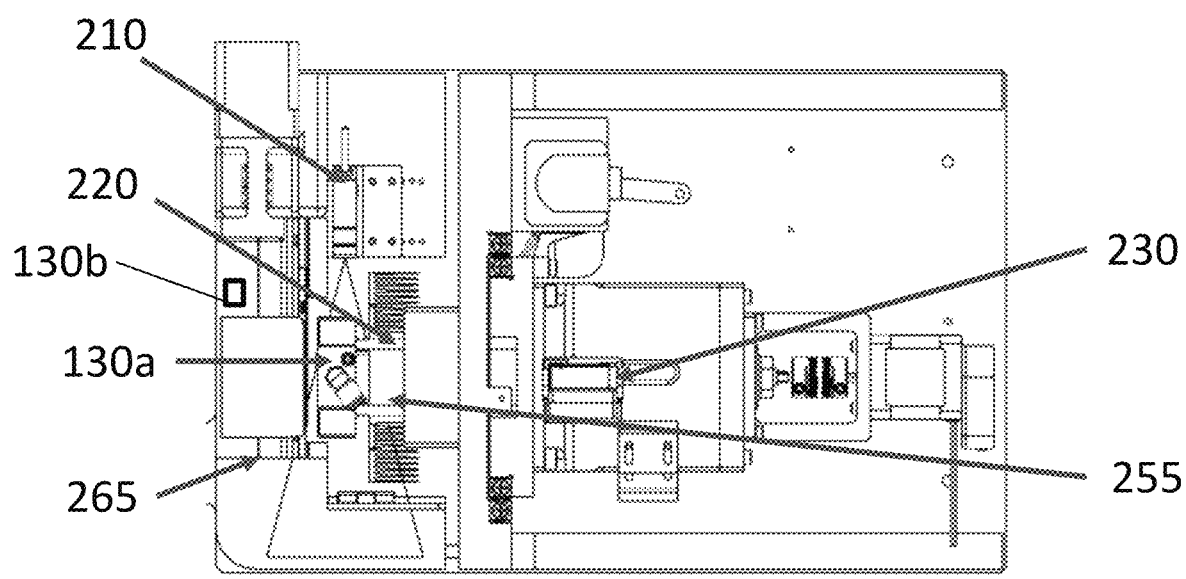
FIG. 2B is a top view illustration of a sample system layout in accordance with some embodiments of the present disclosure.
Figure 3:
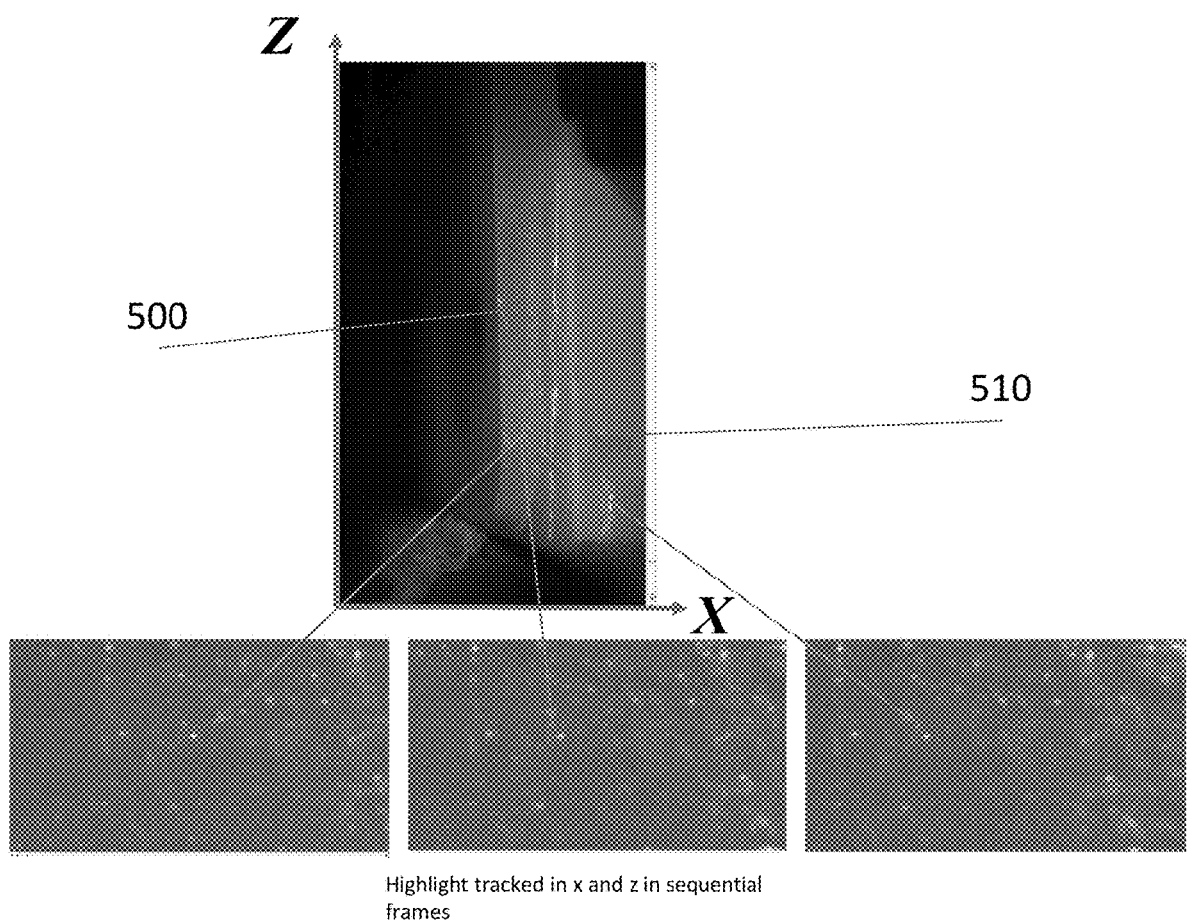
FIG. 3 an exemplary high-level illustration of a feature tracking system in accordance with some embodiments of the present disclosure.
Figure 4:
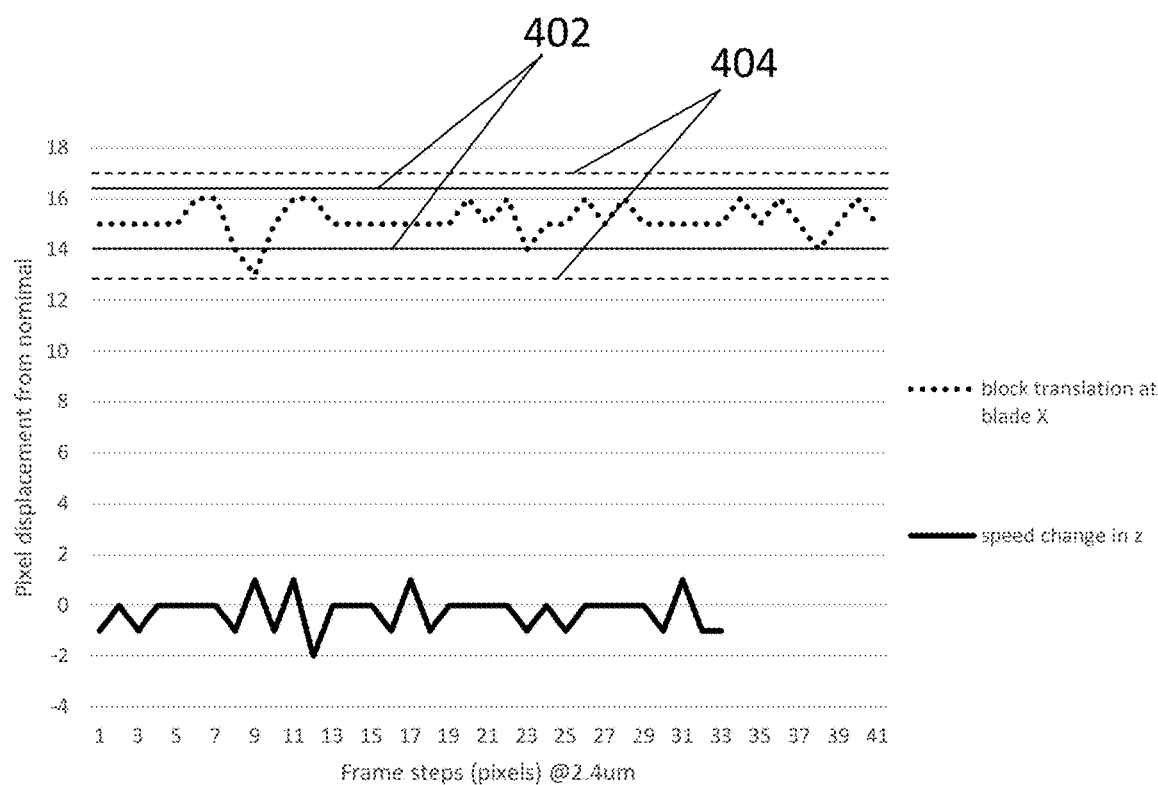
FIG. 4 is a graph illustrating tissue block displacement vs. speed changes at an interface between a tissue block and a microtome.
Figure 5:
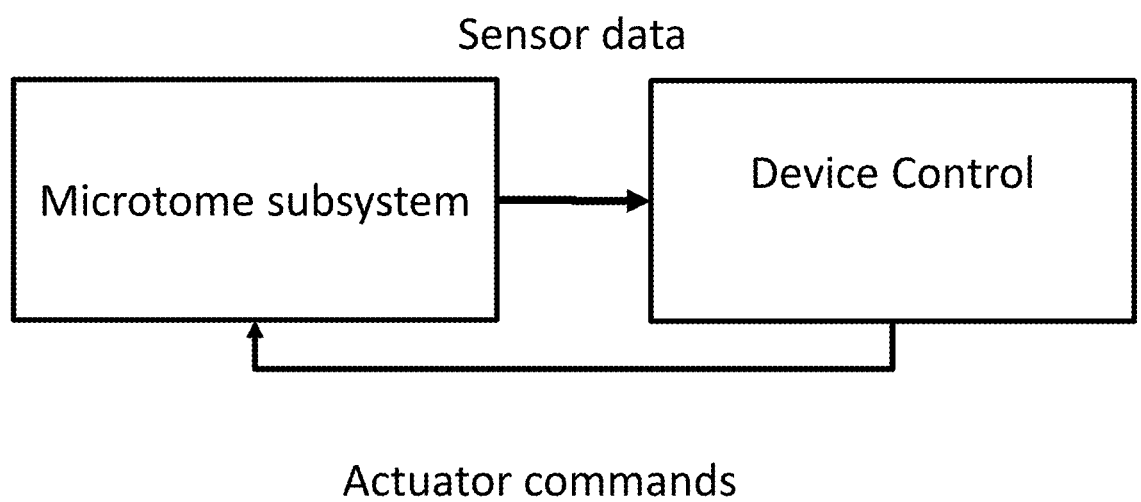
FIG. 5 is a block diagram illustrating a control feedback loop in accordance with some embodiments of the present disclosure.
Figure 6:
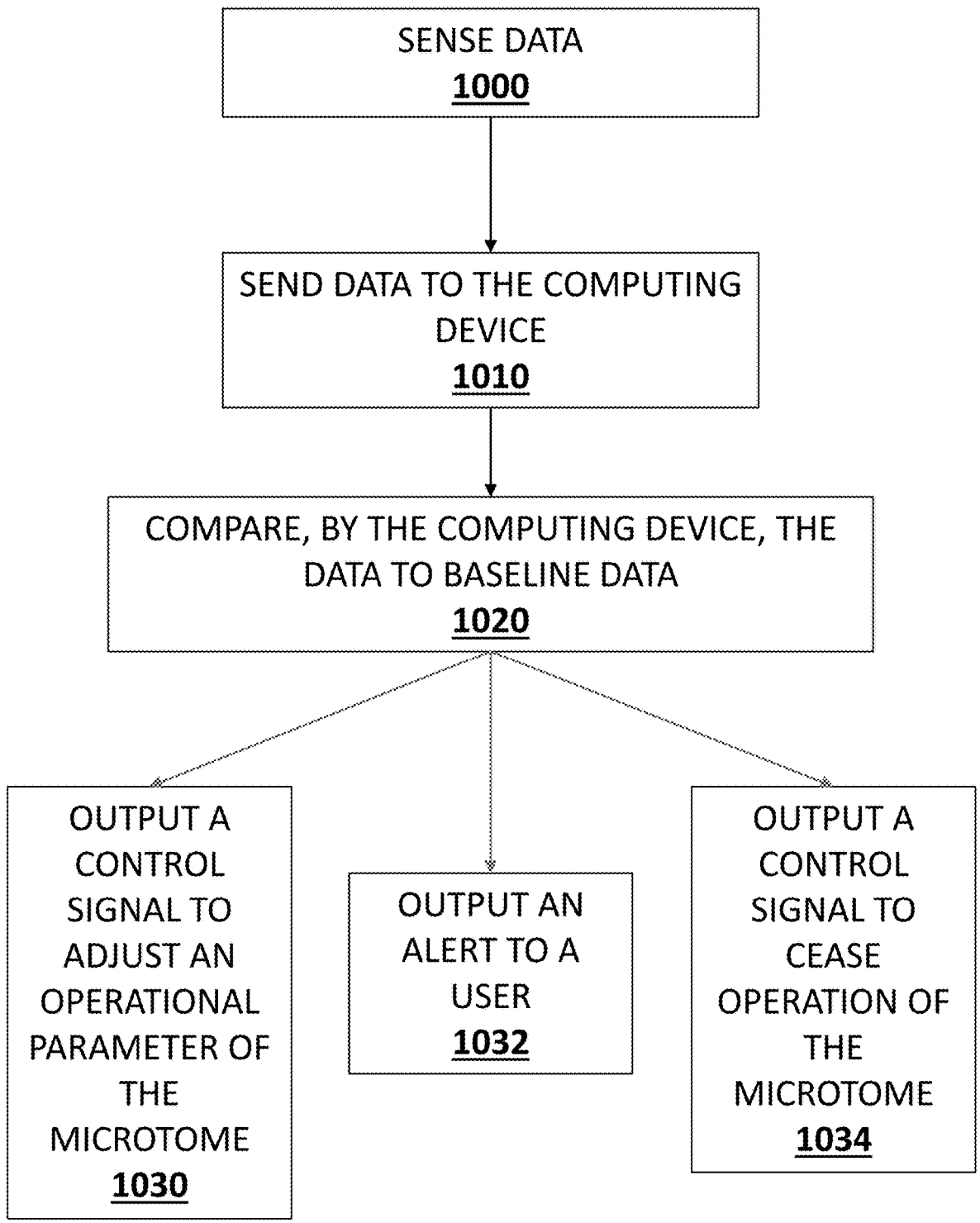
FIG. 6 is a flow chart illustration of a sample method of operation in accordance with some embodiments of the present disclosure.
Figure 7:
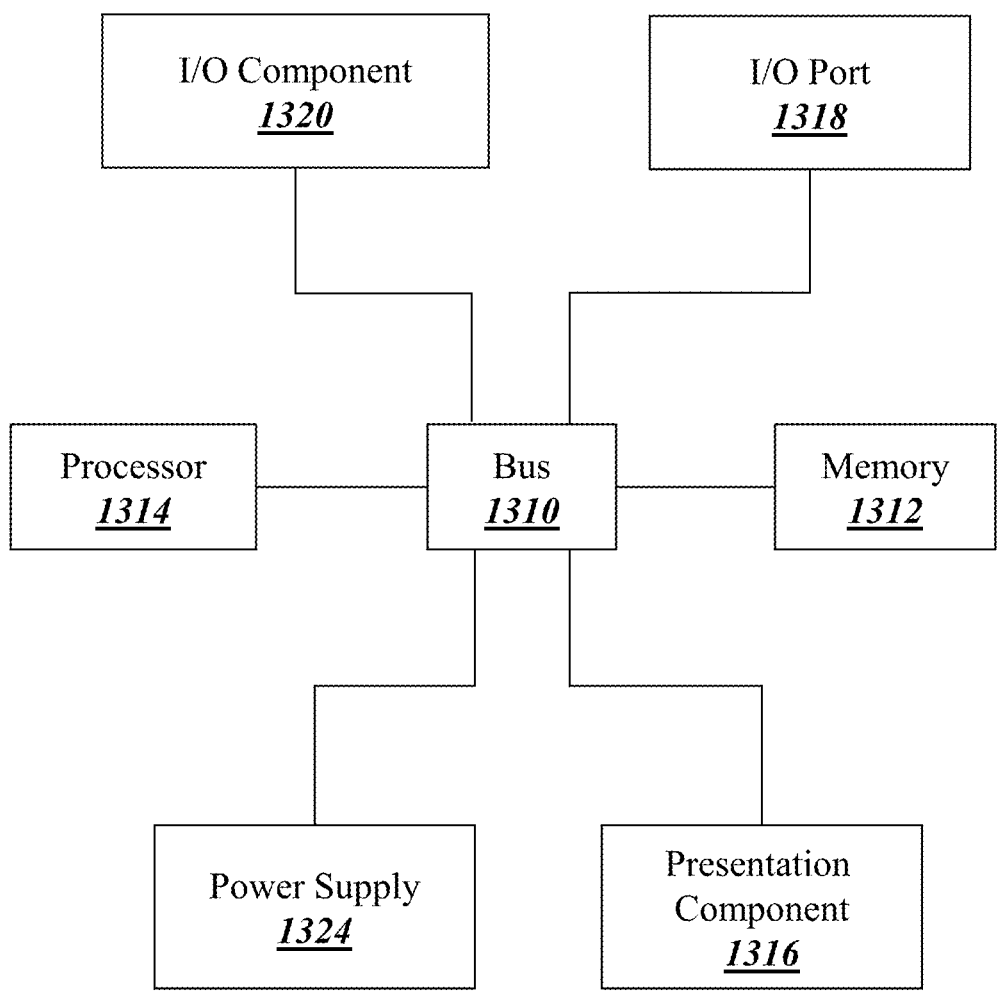
FIG. 7 is an exemplary high-level architecture for implementing processes in accordance with the present disclosure.

FIG. 1A is an above view illustration of a sample system layout in accordance with some embodiments of the present disclosure. FIG. 1B and FIG. 1C are isometric view illustrations of a sample system layout in accordance with some embodiments of the present disclosure. FIG. 2A is a side view illustration of a sample system layout in accordance with some embodiments of the present disclosure. FIG. 2B is a top view illustration of a sample system layout in accordance with some embodiments of the present disclosure. FIG. 3 an exemplary high-level illustration of a feature tracking system in accordance with some embodiments of the present disclosure. FIG. 4 is a graph illustrating tissue block displacement vs. speed changes at an interface between a tissue block and a microtome. FIG. 5 is a block diagram illustrating a control feedback loop. FIG. 6 is a flow chart illustration of a sample method of operation in accordance with some embodiments of the present disclosure. FIG. 7 is an exemplary high-level architecture for implementing processes in accordance with the present disclosure. FIGS. 8A-8E are exemplary data of force measurements while slicing a tissue block. FIG. 9 is a flow chart illustration of a sample method of operation in accordance with some embodiments of the present disclosure.

In some embodiments, the present disclosure can be used with tissue blocks containing biological samples, such as tissue. The system and method of the present disclosure can be used for efficiently processing and separating the tissue blocks. The tissue samples are typically embedded in a preservation material, such as paraffin wax or a similar material. The embedding process can include any combination of processes for producing tissue blocks which are designed to be cut by microtomes 104. For example, biological samples can be encased within a mold along with a liquid substance, such as wax or epoxy, that can harden to produce the desired shaped block. Once tissue blocks have been created, they can be inserted into an automated system 100 for cutting into tissue sections that can be placed on slides for observation.

In particular, as is discussed in more detail below, the automated system 100 is designed to accept one or more tissue blocks, where each tissue block comprises a tissue sample embedded in an embedding or preservation material. The tissue blocks are delivered to one or more microtomes 104. Next, the one or more tissue blocks are "faced" using one or more microtomes 104 by removing the layer of the preservation material in which the tissue sample is embedded to expose a large cross section of the tissue sample, for example, the front face of the tissue sample. Such exposed surface of the tissue sample of the tissue block is referred to as a blockface. Once the tissue block is faced, the tissue block can be hydrated and cooled prior to sectioning (cutting tissue sections that can be placed on slides for observation) the tissue block. Next, one or more tissue sections comprising a portion of the tissue sample can be sliced from the faced tissue block using one or more microtomes 104. The tissue sections are transferred, for example, using an automated transfer medium, from the one or more microtomes 104 to slides for further processing.

Referring to FIG. 1A, FIG. 1B, and FIG. 1C, in some embodiments, an automated pathology system 100 is provided for preparing slides of tissue sections. Such systems can be configured for increased throughput during tissue sectioning. The system 100 can be designed to include a block handler 102, one or more microtomes 104, a transfer medium 106 (e.g., a tape), a hydration chamber 108, and a block tray 110. The block tray 110 can be a drawer-like device designed to hold a plurality of tissue blocks and can be placed into the system 100 for access by the block handler 102. The block tray 110 can have multiple rows each designed to hold one or more tissue blocks and can have sufficient spacing such that the block handler 102 can index, grab, and remove one tissue block at a time. In some embodiments, the block tray 110 can be designed to securely hold the tissue blocks by using, for example, a spring-loaded mechanism, so that the tissue blocks do not shift or fall out of the block tray 110 during handling. In some embodiments, the spring-loaded mechanism can further be designed such that the block handler 102 can pull the tissue blocks out without damaging or deforming them. For example, the pitch of the tissue blocks within the block tray 110 can enable the block handler grippers of the block handler 102 to access a paraffin block without interfering with adjacent blocks. The block handler 102 can include any combination of mechanisms capable of grasping and/or moving tissue blocks in and out of a microtome 104, specifically, into a chuck 250 (FIG. 2A) of the microtome 104. For example, the block handler 102 can include a gantry, a push and pull actuator, or a gripper on a Selective Compliance Assembly Robot Arm (SCARA) robot.

Still referring to FIGS. 1A, 1B, and 1C, in some embodiments, the system 100 can include a combination of mechanisms to transfer a tissue section cut from the tissue block onto the transfer medium 106 to be transferred to a slide for analysis. The combination of mechanisms can include a slide adhesive coater 112, a slide printer 114, slide input racks 116, a slide singulator that picks a slide from a stack of slides 118, and slide output racks 120. This combination of mechanisms works together to prepare the tissue section on the slide and prepare the slide itself.

In some embodiments, the one or more microtomes 104 can include any combination of microtome types known in the art, specifically, for precisely sectioning tissue blocks. For example, the one or more microtomes 104 can be a rotary, cryomicrotome, ultramicrotome, vibrating, saw, laser, etc. based design. In some embodiments, the one or more microtomes 104, as shown in FIG. 2A, can include a chuck assembly 251 and a cutting assembly 252. In some embodiments, the chuck assembly 251 and the cutting assembly 252 can move relative to each other up and down along a vertical axis (i.e. in the Z direction shown in FIG. 2A), axially along a horizonal axis (e.g., in a direction of the thickness of a tissue block, the X direction shown in FIG. 2A), laterally (i.e. in the Y direction shown in FIG. 2A), and/or rotationally. In some embodiments, the chuck assembly 251 can move in three directions relative the cutting assembly 252. The one or more microtomes 104 can include any combination of components for receiving and sectioning a tissue block. For example, the one or more microtomes 104 can include a knife-block with a blade handler for holding a changeable knife blade and a specimen holding unit with a chuck head and a chuck adapter for holding a tissue block. The cutting assembly 252 can generally include a blade 270 (FIG. 2A) and a blade holder 260 (FIG. 2A). The chuck assembly 251 can generally include a chuck 250 (FIG. 2A).

In some embodiments, the one or more microtomes 104 is configured to cut a tissue section from a tissue sample enclosed in a supporting block of preservation material such as paraffin wax. The one or more microtomes 104 can hold a blade 270 (FIG. 2A) aligned for cutting tissue sections from one face of the tissue block—the block cutting face or blockface. For example, a rotary microtome, can linearly oscillate the chuck 250 holding the tissue block with the block cutting face in the blade-cutting plane, which combined with incremental advancement of the block cutting face into the cutting plane, the microtome 104 can successively shave thin tissue sections off the block cutting face. While the blade 270 is particularly discussed in detail herein, it should be appreciated that the same description can apply to any other cutting mechanisms that may be included in the microtome.

In operation, the one or more microtomes 104 is used to face and/or section tissue blocks. When the tissue block is initially delivered to the one or more microtomes 104, the tissue block can be faced. Facing is removing a layer of preservation material from the tissue block and exposing the large cross section of the tissue sample embedded in the tissue block. That is, the preservation material, with the tissue sample embedded in it, can first be subjected to sectioning with relatively thick sections to remove the 0.1 mm-1 mm layer of paraffin wax on top of the tissue sample. When enough paraffin has been removed, and the complete outline of the tissue sample is exposed, the block is "faced," and ready for acquisition of a processable tissue section that can be put on a glass slide. The exposed face is referred to as a blockface or block cutting face. For the facing process, the one or more microtomes 104 can shave off sections of the tissue block until an acceptable portion of the tissue sample within the tissue block is revealed. In some embodiments, the system can include on or more cameras to identify when an acceptable portion of the tissue sample within the tissue block is revealed. For the cutting process, the one or more microtomes 104 can shave off a section of the tissue sample of the tissue block with an acceptable thickness to be placed on a slide for analysis.

Once the tissue block is faced, in some embodiments, the faced tissue block can be hydrated (for example, in a hydration chamber 108 or directly at the one or more microtomes 104) for a period of time in a hydrating fluid. In addition to being hydrated, the tissue block can be cooled. The cooling system can be part of the hydration chamber 108 or a separate component from the hydration chamber 108. In some embodiments, the cooling system can provide cooling to all the components within a sectioning chamber 150. The sectioning chamber 150 can provide insulation enclosing the one or more microtomes 104, the hydration chamber 108, the block tray 110, the blade holder and the blade exchanger of the microtome 104, and the cameras. This way there are minimal number of openings in the insulation, which can increase the efficiency and effectiveness within the sectioning chamber 150. Regardless of location, the cooling system can have a mini compressor, a heat exchanger, and an evaporator plate to create a cool surface. The air in the sectioning chamber 150 can be pulled in and passed over the evaporator plate, for example, using fans. The cooled air can circulate in the sectioning chamber 150 and/or hydration chamber 108 to cool the paraffin tissue blocks. The mass of equipment in the cooling chamber can provide a thermal inertia as well. Once the chamber is cooled, its temperature can be maintained more effectively, for example, if an access door is opened by the user to remove the block tray 110. In some embodiments, the temperature of the tissue block is maintained between 4° C. to 20° C. Keeping the tissue blocks cool can benefit the sectioning process as well as the hydration process.

Once the tissue block has been sufficiently hydrated, in some embodiments, it is ready for sectioning. Essentially, the one or more microtomes 104 cuts thin sections of the tissue samples from the tissue block. The tissue sections can then be picked up by the transfer medium 106, such as a tape, for subsequent transfer for placement on the slides. In some embodiments, depending on the microtome 104 setup of the system 100, the system 100 can include a single or multiple transfer medium 106 units. For example, in tandem operation, the transfer medium 106 can be associated with a polishing and sectioning microtome 104, whereas in a parallel operation, a separate transfer medium 106 can be associated with each microtome 104 within the system 100. In some automated systems, each of these processes/steps of facing, hydration, sectioning, and transfer to slides are computer controlled rather than performed in the manual workflow by the histotechnician.

Still referring to FIG. 1A, FIG. 1B, and FIG. 1C, in some embodiments, the transfer medium 106 can be designed in a manner in which a tissue section cut from the tissue sample in the tissue block adheres to and can then be transported by the moving transfer medium 106. For example, the transfer medium 106 can include any combination of materials designed to physically (e.g., electrostatically) and/or chemically adhere to the tissue sample material (e.g., a tissue section). The transfer medium 106 can be designed to accommodate a large number of tissue sections to be transferred to slides for evaluation. In some embodiments, the transfer medium 106 can be replaced by a water channel to carry tissue. The system 100 can include any additional combination of features for use in an automated microtome design.

In some embodiments, the system 100 can follow a process to face, hydrate, section, and transport cut tissue sections to slides in an efficient automated fashion.

In some embodiments, the system 100, can predict the cut quality of a given microtome 104 based on one or more physical measurements using at least one sensor during the operation of the microtome 104. The prediction of the cut quality of the microtome 104 can be advantageous to prevent any damage to the tissue sections, in contrast to only adjusting the microtome 104, such as the blade 270 (FIG. 2A) and/or the chuck 250 (FIG. 2A) holding the tissue block, after damage to the tissue sections is found. Further, by preemptively preventing departures from a baseline physical state (i.e. a normal operating state of the microtome 104), the automated system 100 can infer tissue quality variations before they occur. Such a system can prevent unnecessary waste of tissue to allow for a more efficient use of the biopsied sample.

In some embodiments, as shown in FIG. 2A and FIG. 2B, a set of one or more sensors can provide information on the integrity of the microtome 104. In some embodiments, the set of one or more sensors may include an accelerometer 255. The accelerometer 255 may be referred to as a force-based sensor. For example, the accelerometer 255 can be disposed on the chuck 250 or other portion of the chuck assembly 251. The accelerometer 255 can be provided to measure dynamics of the chuck 250 or other portion of the chuck assembly 251. The accelerometer can detect departures or changes in the motion characteristics of the chuck 250 or other portion of the chuck assembly 251. The motion characteristics can be, as an example, the range in position of the chuck 250 or other portion of the chuck assembly 251 during normal use. The departures in the motion characteristics (e.g. a shift in the range of motion compared to the range of motion of the chuck 250 or other portion of the chuck assembly 251 in a normal operating state) can be indicative of a loose part in the chuck 250, or any other fastener in the local system, such as the chuck assembly 251. The loose parts in the chuck 250, or other fasteners in the local system, can create unwanted relative motion between the chuck 250 and the tissue block received in the chuck 250, thereby degrading the cut quality of the microtome 104 when sectioning the tissue block. In some embodiments, the accelerometer 255 can additionally measure static states, or orientations, of the microtome 104 to determine, for example, the relative orientation of the microtome 104 to other structure within the system 100. In some embodiments, the accelerometer can measure static states, or orientations of the chuck 250, or other portion of the chuck assembly 251, to determine, for example, the relative orientation of the chuck 250, or other portion of the chuck assembly 251, to other structures of the microtome 104. The accelerometer 255 can, in some embodiments, measure low frequency vibrations, DC vibrations, or zero order changes. The accelerometer 255 can be used in combination with any other sensors discussed herein. For instance, as discussed herein, in some embodiments, the set of one or more sensors can be one or more of a photo sensor, a video sensor, a highspeed image sensor, a laser sensor, a load sensor, a strain gauge, and/or a microphone or acoustic sensor. Any one of these sensors can be configured to measure static or dynamic conditions of the microtome 104 or other structures in the system alone or in combination.

In some embodiments, an accelerometer 265 can be on the blade holder 260 or other portion of the cutting assembly 252 to detect structural changes in the blade holder 260 or other portion of the cutting assembly 252. In some embodiments, the accelerometer 265 can detect changes in the motion characteristics of the blade holder 260 and/or other portion of the cutting assembly 252. The blade holder accelerometer 265 can be used in addition to the chuck accelerometer 255, or any other sensors discussed herein, or used alone. Depending on the location of the accelerometer 265, the stiffness of blade 270 clamping can be detected as well. The accelerometer 265 can function similar to the accelerometer 255 described above. For instance, the accelerometer 265 can measure dynamics that can be indicative of a loose part in the blade holder 260 or other portion of the cutting assembly 252. In some embodiments, the accelerometer 265 can measure static states, or orientations of the blade holder 260, or other portion of the cuttings assembly 252, to determine, for example, the relative orientation of the blade holder 260, or other portion of the cutting assembly 252, to other structures of the microtome 104 system.

In some embodiments, the microtome 104 system can be excited using a motor at different frequencies to create a Frequency Response Function (FRF) and measure dynamics of the microtome 104. In some embodiments, the motor can be a buzzing stepper motor. In some embodiments, dedicated piezo-actuators can be placed on the microtome 104 system for cleaner excitation. This excitation method can be used in other items below whenever excitation of the microtome 104 system is required. The motor 262 can be located in the microtome 104. In addition, or alternatively, there can be at least 3 motors to control functions of the microtome blades 270. The at least three motors can be located in the cutting assembly 252. One of the three motors can be a microtome X motor 264 that can actuate the microtome blade 270 to determine the thickness of a cut. Another of the three motors can be a microtome Z motor 266 to actuate the microtome blade 270 for the up and down cutting motion. The third actuator can be a blade clamp motor 268 on the blade holder 260. In an alternative to using the motor 262, a user can power these motors 264, 266, 268 such that they do not move about an axis but buzz in place creating vibrations at a known frequency range. This actuation can be the input vibration excitation to the microtome 104 system. These vibration waves can travel through the microtome structure (e.g. the blade holder 260, blade 270, or other part of the cutting assembly 252) and get picked up by a sensor such as a microphone, an accelerometer, or a force gauge located on or near the microtome blade 270 or other portion of the cutting assembly 252. The vibration sensors can be used in combination with any of the other sensors discussed herein. The signal from the sensor is the output reading from the system. The output reading depends on the input excitation signal and the structural configuration of the microtome 104. For example, in a baseline case, when the microtome blade 270 is in a normal operating condition and cutting good quality tissue sections consistently, the system can understand that all of the components are fastened together at a proper, pre-defined, torque. When the baseline configuration is excited (i.e. vibrated), the output reading can carry certain frequency components in it. Now, in a second configuration, the microtome 104 system can have loose parts or parts otherwise modified due to regular usage or damage. This sub-optimal configuration can be excited such that the output reading will have a different set of frequencies contained in it compared to the output generated when exciting the baseline configuration. The signal processing step to detect these frequencies is called frequency analysis and the signal processing step can generate a Frequency Response Function (FRF), where an FRF is a power spectrum graph. The peaks that occur in baseline and sub-optimal FRFs may be at different frequencies and one can conclude by looking at the shifting peaks that the microtome 104 performance is degrading. It is important to note that using an FRF is one exemplary method. In some embodiments, the system can employ AI to detect patterns in the time-series or frequency domain data to find trends and suggest solutions.

While exciting the cutting assembly 252, specifically, with one or more motors was discussed in detail above, it should be appreciated that the same approach may be taken to excite the chuck assembly 251 and analyze the configuration or operating state of the chuck assembly. For instance, a thickness axis motor may be attached to the chuck 250 or other portion of the chuck assembly 251, and if buzzed, can create excitation vibrations on the chuck 250 or other portion of the chuck assembly 251.

In some embodiments, a multi-axes force sensor 220 can be disposed on the microtome 104. The multi-axes force sensor 220 can be used to measure dynamics of the microtome 104. In some embodiments, a multi-axes force sensor 220 can be disposed on the chuck 250 or other portion of the chuck assembly 251. The multi-axes force sensor 220 can detect and measure the magnitude and phase shifts of the forces acting on the chuck 250 while cutting a reference material, not shown, to determine a baseline or expected set of data relating to a normal operating state of the chuck 250 or other portion of the chuck assembly 251 to compare against data collected during use of the microtome 104 to section a tissue block. The reference material could be a certain width of the paraffin edge of the block (that is before reaching the tissue area). Alternatively, the system can be excited by a motor buzzing or a piezo-actuator to detect and measure a baseline of expected forces on the chuck 250 during use while in a normal operating state. Similar to the independent excitation, or excitation during use, of the cutting assembly 252, as discussed above, an algorithm can compare deviation of peak frequencies to a baseline and make a decision based on those deviations dependent on specific microtome design characteristics and the detection accuracy required for a given tissue sample. While the chuck assembly 251 was specifically discussed above, it should be appreciated that the multi-axes force sensor 220 can be disposed on the blade holder 260 or other portion of the cutting assembly 252 and used the same way to measure forces acting on the blade holder 260 or other portion of the cutting assembly 252.

In some embodiments, in addition to or instead of the accelerometer 265, the system can use additional sensors to measure the dynamics (e.g. force, change in position, velocity, or acceleration) of the microtome 104. The additional sensors can measure the dynamics of one or more components of the chuck assembly 251 and/or the cutting assembly 252. The dynamics of the microtome blade 270, for example, can be how the blade 270 moves, including vibration level motion. The dynamics of the microtome blade 270 can include vibration characteristics, such as acceleration magnitude and frequencies. In some embodiments, these additional sensors can be used independently from the chuck accelerometer 255, the accelerometer 265, and the multi-axes force sensor 220. In some embodiments, there are ways of measuring the dynamics of the microtome 104, such as the blade holder 260, for instance, without effecting the dynamics of the part that is being measured. For example, these sensors and methods may not change the stiffness or add mass to the system. Such sensors could use ultrasound or laser measurements. For example, a laser sensor can be placed to measure the vibrations of the blade 270 or blade holder 260. If the magnitude of these vibrations exceeds a certain threshold, or the FRF as described before shifts beyond a threshold, the system can determine that the microtome 104 cut quality may be in question. In some embodiments, the laser sensor can be a laser Doppler vibrometer.

In some embodiments, the system can include a linear encoder 210 to measure dynamic information. The linear encoder 210 can be located within the chuck assembly 251. For instance, a first portion of the linear encoder 210 can be coupled to a static base portion of the chuck assembly 251, and a second portion of the linear encoder 210 can be coupled to the chuck 250, which moves. The resolution of the linear encoder 210 can be in the range of 50 nm to 100 nm depending on the system. The linear encoder 210 can detect vibrations as well as precise axis positioning. A benefit of the linear encoder 210 is that there is an insignificant added mass to the system. The linear encoder 210 can be used in combination with any of the other sensors discussed herein. While implementation with the chuck 250 is specifically discussed above, it should be appreciated that the linear encoder 210 can be positioned within the cutting assembly 252 to sense displacement or vibrations of the blade holder 260, for instance, or other portion of the cutting assembly 252.

In some embodiments, the system can include a non-contact reflective laser sensor 230 to measure dynamic and/or static information. In some embodiments, the non-contact reflective laser sensor 230 can be positioned such that it is directed toward one or more components of the chuck assembly 251 and/or the cutting assembly 252. With respect to the cutting assembly 252, for instance, the non-contact reflective laser sensor 230 can be positioned such that it is directed to the microtome blade 270 to detect vibrations on the blade 270. It should be appreciated that the non-contact reflective laser sensor 230 can be used to detect vibrations of the chuck 250, for instance. The system can create an alert when the vibrations are out of an allowed range. The non-contact reflective laser sensor 230 can be used in combination with any other sensors discussed herein.

In some embodiments, the sectioning system can include a highspeed camera 215 to make dynamic or static measurements. In some embodiments, the highspeed camera 215 can measure vibrations. For example, the highspeed digital camera 215 can be used to take multiple photos, per second, and compare the location information from the photos to determine the relative location of the microtome 104 components to measure vibrational offsets. In some embodiments, the highspeed camera 215 can be focused on one or more components of the chuck assembly 251 and/or the cutting assembly 252. For instance, the highspeed camera 215 can be focused on the blade 270 and can detect vibrations of the blade 270 during cutting. In some embodiments, for example, in a controlled fashion, one can excite the blade holder 260 and detect the vibrations of the blade 270 in a non-invasive way using the highspeed camera 215. For example, the camera 215, as generally shown in FIG. 1C, can be angled to point at a microtome 104. In some embodiments, the data derived from the highspeed camera 215 can be displacement data. In some embodiments, the images from the highspeed camera 215 can be used to determine acceleration data which can be used in conjunction with the displacement data to predict the cut quality of the microtome 104. For example, the system can define normal motion characteristics (i.e. a baseline motion within which the component under inspection should operate during a normal status) and if the measured displacements are outside the normal motion characteristics, the cut quality of the microtome 104 can be assumed to be sub-optimal. The highspeed camera 215 can be used in combination with any other sensors discussed herein.

In some embodiments, one or more high-speed cameras 215 can be used to trace marker pixels throughout the motion of a tissue block 500 during a sectioning process. The data collected by the high-speed cameras 215 can be used to determine the speed of the tissue block 500 along one or more axes, for instance. The axes of motion, in the X and Z directions, shown in FIG. 3, correspond to the coordinates shown in FIG. 2A. In the illustrated embodiment, the X motion can correspond to the axial movement of the chuck 250, and therefore the tissue block 500. Further, the Z motion can correspond to the vertical movement of the microtome blade 270 during a cut, for example. In operation, as shown in FIG. 3, sample pixels can be picked for tracing a tissue block 500. Features tracked along sequential high-speed camera (HSC) images allow for detailed tracking of movement both vertically and axially. For example, wax feature "high brightness" reflections 510 on the tissue block 500 can be between 1-2 pixels in size. In use, the system can have a pixel count variance and the pixel count variance in a given direction can be attributable to changes in speed, cut thickness, or depth in the tissue block 500. The pixel count variance generally relates to the number of pixels that the reflections move in the highspeed camera images. For instance, the camera 215 can remain stationary, such that pixels in the images move along with the tissue block 500, and the speed of the pixel movement can be calculated based on the framerate, magnification, and pixel position in the image data. Pixel count variance in the axial direction can be attributable to tissue block 500 variation in position along the axial direction (i.e. changes in the cut depth on the wax/tissue of the tissue block 500). In some examples, the interaction of the paraffin block, or tissue block 500, with the blade 270 can result in a momentary change in speed, which can be recovered in the next cycle. The one or more high-speed cameras 215 can be used in combination with any other sensors described herein.

In FIG. 4, a graph of the speed of the selected pixels, or points, is shown. The cutting can be due to motion of the microtome 104 in Z axis (i.e. movement of one or both of the blade 270 or chuck 250 along the Z axis to create relative movement between the blade 270 and the chuck 250 in the Z direction). In some embodiments, the camera 215 can be a high-speed camera that can determine changes in the speed of one or more components of the microtome 104 as well as displacement changes of the tissue block 500, for instance at the blade 270 during cutting of the tissue block 500, at various speeds, such as, for example between at 540 and 580 fps or 560 fps. The top plot of the graph in FIG. 4 shows the motion of the tissue block 500 in X direction and the plot at the bottom of the graph shows the speed change in the Z direction. In the illustrated example, the relative axes are marked in FIG. 3. The bottom images in FIG. 3 can indicate a slow-down, or transition, when the tissue block 500 may hit the blade 270 or when the blade 270 transitions from paraffin to the tissue embedded in the paraffin. In this example, the transitions are shown at Frame Step 9 and 19, as seen in FIG. 4.

This data can be useful to determine, or prognosticate, if there is a problem with the system such that poor cut quality may be expected. For example, if the tissue chuck 250 or other portion of the microtome 104 is loose, the changes in at least one of the tissue block 500 translation and speed can be outside of an expected range 402. The expected range 402 can relate to baseline data and indicate an expected range of motion of the tissue block 500 during normal operation of the microtome 104. Looking at Frame Step 9, the pixel displacement can be outside the expected range 402. In some embodiments, any pixel displacement outside the expected range may be analyzed as indicating the microtome 104 is not operating under normal conditions, and the system may take action to correct the microtome 104. In some embodiments, the system may analyze the pixel displacement data with respect to an expected deviation 404 outside of the expected range 402. Looking to FIG. 4, at Frame Step 9 or 19, the pixel displacement can be inside of the expected deviation 404, shown as a dashed line, in which case the algorithm may determine that the system is in working condition. For instance, while outside of normal operating conditions, because the displacement did not exceed the expected deviation 404, the system may determine the microtome 104 is still in working condition and continue operation until the displacement exceeds the expected deviation 404, at which point the system may take an action to correct the microtome 104. For instance, if at Frame Step 9 or 19, the pixel displacement is outside of the expected deviation 404, the algorithm may determine that the system is in need of servicing to prevent damage to the tissue block 500.

To account for any change or to fix the system on the go would depend on the kind of problem detected in the microtome 104. For example, if a loose blade clamp is detected, then the blade clamp motor could be over driven. In another example, if a loose chuck 250 is detected, the speed of the cut can be changed to sustain the cut quality temporarily, before the problem can be structurally fixed. This would allow for the system to be operational until it is fixed by field service.

With the instant algorithm, or tool, the system can track the build quality of the microtomes by at least one of (1) measuring microtome variance in speed vs microtome sensor data; (2) measuring paraffin block placement variance vs holder and spring performance; and (3) setting a performance requirement to test and verify against. For example, with a high-speed camera (HSC), such as the camera 215, pixel data from the imaging system can track the build quality of the microtomes by at least one of (1) measuring microtome variance in speed vs microtome sensor data; (2) measuring paraffin block placement variance vs holder and spring performance; and (3) setting a performance requirement to test and verify against. Each microtome can be tested against a respective predetermined design performance requirements, within which the microtome should operate when normal.

In embodiments where the microtome variance in speed is measured against the microtome sensor data, the system can employ optical measurements, using one or both of cameras 215, 115, to obtain optical test data to confirm and compare with the microtome sensor data (i.e. any of the above or below described sensor data from sensors other than the cameras 215, 115) for variance in speed in, for instance, the Z direction of FIG. 2A. In some embodiments, the optical measurement data is coincident in time with the tissue chuck 250 movement towards the blade 270, in the X direction. If the amplitude of relative motion determined from the microtome sensor data, including any of the above or later described sensor data, is out of a specified bounds in magnitude, frequency, or other physically related analytical quantity, the system can inform a user that the microtome 104, for instance the blade 270 or chuck 250, is trending out of predefined, or specified, limits (i.e. trending our of normal operating conditions). In some embodiments, the sensed motion characteristics can be indicative of an impact of the paraffin block with the microtome blade 270. In some embodiments, the camera 215, 115 can be one of a high speed, a still image, or a video camera or a similar imaging sensor.

In some embodiments, where the paraffin block placement variance is measured against the tissue chuck 250 and associated spring performance, optical test data can confirm that a tissue block is secured in a known position within the tissue chuck 250 and the spring strength of the tissue chuck 250 is behaving according to a design requirement. The optical test data, for instance from the highspeed camera 215, can show a variance of movement beyond an acceptable range, therefore indicating the microtome 104 is not in normal operating conditions and that the spring is set too weak, set incorrectly, or if the spring is failing.

In some embodiments, the system can set an expected performance requirement to test and verify against. In some embodiments, the preliminary build of the system can perform an initial test (e.g. sectioning a reference material) to obtain baseline, or initial, test data with a so-called "verified built microtome" of known qualities (i.e. a normal microtome, or microtome under normal operating conditions). In some embodiments, the baseline test data can be established by sectioning tissue and establishing tissue cut quality by executing the expected function of the microtome 104 each time. The baseline data can be the metric for which manufactured microtome builds can be tested against, and tracking software can be used to automate the capture of data and perform a comparison of live data against the baseline data.

In some embodiments, the instant system can function with a closed loop control and condition monitoring system, as shown in FIG. 5. Such a system can take input data from the variety of sensors, discussed above or below, and input them into a device control computer, for example, system 1300 as shown in FIG. 7. In some embodiments, a control and decision algorithm, or a non-transitory computer readable medium, can run on the system 1300 to fuse the sensor data to make a decision on the condition (i.e. whether the microtome 104 is functioning under normal conditions or not) and cut quality of the microtome 104. In some embodiments, the control system controls one or more components (e.g. actuators) of the microtome 104 to compensate for any sensed deteriorations in the microtome 104 performance. In some embodiments, the control system controls one or more components (e.g. actuators) to correct the portion of the microtome 104 causing the microtome 104 to behave outside normal conditions. In some embodiments, the system can, additionally or alternatively, generate an alert to warn a user if the self-correction is not sufficient or if user intervention is otherwise needed.

In some embodiments, the system can additionally, or alternatively, include post sectioning quality detection. For example, when a tissue section is taken on tape, in an ongoing fashion, the undulations and other periodic marks are searched for and analyzed on image of the tissue section. Existence of such marks on the tissue sample may indicate a loose part in the microtome 104 or deterioration in the sectioning quality. In addition, the system can measure the thickness of the tissue sections on the tape to determine section to section variations and relate these to structural integrity of the microtome 104. For example, a camera 115, as seen generally in FIG. 1B, can point to a tissue section on tape or glass to determine the source of tissue quality deviations. Additionally, the camera 115 can include a dedicated illumination system that can provide illumination on demand at various predetermined wavelengths. In some examples, tissue quality deviations can be determined using quality control algorithms, such as those disclosed in commonly owned U.S. application Ser. No. 17/451,870, entitled "FACING AND QUALITY CONTROL IN MICROTOMY," incorporated by reference in its entirety herein. Those quality control algorithms can compare a first imaging data, or a baseline image, to a second imaging data, obtained after a cut, to confirm correspondence in the tissue sample in the first imaging data and the second imaging data based on one or more quality control parameters to determine deviations or quality control issues in the cut quality or microtome 104. The camera 115 can be used in combination with any other sensors described herein.

In some embodiments, the system can include additional sensors 130a, 130b, shown generally and without regard for the specific location in FIG. 2B. For example, the sensor 130a can be a force-based sensor, such as a loadcell. The force sensor 130a can be in series, meaning the load cell can be mounted behind the sample chuck 250 and detect any forces applied to the tissue block held in the chuck 250. As discussed above, the instant system can perform analysis and detection using tools for acceleration and vibration data analysis with data from the sensor 130a. The force sensor 130a can be used in combination with any other sensors discussed herein.

In some embodiments, the system can additionally, or alternatively, include a sensor which can be a temperature sensor 130b. The temperature sensor 130b can be a thermocouple or an IR temperature measurement device that is pointed toward the tissue block or another reference surface. In some embodiments, as an example, if the temperature sensor 130b determines that the tissue block is reaching temperatures that exceed a predetermined maximum, the system may determine that the tissue is at risk of heat damage and may alert the operator or self-adjust one or more parameters or operations to correct the temperature. The temperature sensors 130b can be used in combination with any other sensors discussed herein.

In general, as shown in FIG. 6, the system can be employed to sense data from one or more of the above-mentioned sensors (such as, for example, the sensors 130a, 130b, 255, 265 and cameras 215, 115, described above) in a first step 1000. As discussed above, the sensed data can relate to the dynamics of one or more portions of the chuck assembly 251, the dynamics of a tissue block received in the chuck 250, the dynamics of one or more portions of the cutting assembly 252, and/or characteristics of a tissue section on a transport medium or slide. As discussed above, the sensed data can relate to the static orientation of the tissue block, portion of the cutting assembly 252, and/or portion of the chuck assembly 252. The data from the one or more sensors can then be sent to a local, or remote, computing device in a second step 1010.

In a third step 1020, the computing device can process the data from the one or more sensors with a control algorithm. The control algorithm can compare the sensed data to baseline data, which may be any value or limit, such as predefined maximum or minimum values, predefined ranges, and/or the like. The baseline data can generally relate to normal, or baseline, microtome 104 performance. If the control algorithm determines that the sensed data exceeds any predefined value of the baseline data, including maximum or minimum values or boundaries of a predefined range, for instance, the computing device can generate an output signal in a step 1030, 1032, and/or 1034. Sensed data that exceeds a predefined value of the baseline data, such as a boundary, maximum, or minimum, which may be collectively referred to as a limit of the baseline data, may indicate the microtome is not operating under normal conditions. In some embodiments, the sensed data can be analyzed for trends, and it can be determined that the sensed data indicates the microtome 104 is operating under normal conditions, but that the operating conditions are drifting out of, or toward, the limits of the normal operating conditions. In such embodiments, if the control algorithm determines that the sensed data is drifting out of the normal, baseline data, the computing device can generate an output signal in a step 1030, 1032, and/or 1034.

If it is determined from the sensed data that the microtome 104 is out of normal conditions and/or drifting out of normal conditions, the output signal in the step 1030, can be a control signal to an actuator in the system 100 (e.g. an actuator in the chuck assembly 251 and/or the cutting assembly 252) to alter parameters of the automated tissue sample sectioning to correct the microtome 104 or compensate for the readings by the sensors indicating operation outside of normal conditions or drifting from normal operation conditions. In some embodiments, the control algorithm can issue a signal for corrective action. In some embodiments, the corrective action can be automated by the system 100. For example, the control algorithm may sense dynamics of the microtome 104 outside of acceptable ranges that indicate, for instance, a bracket holding the chuck 250 is in need of being tightened, and the system may output a control signal to tighten the bracket. That is, the system can output a control signal to directly correct the cause of the microtome not operating under normal conditions. In some embodiments, the control algorithm can issue a signal for compensatory action. In some embodiments, the compensatory action can be automated by the system 100. For example, the control algorithm may sense dynamics of the microtome 104 outside of acceptable ranges that indicate, for instance, a bracket holding the chuck 250 is in need of being tightened, and the system may output a control signal to adjust operation of one or more driving motors of the chuck assembly 251 to compensate for the effects of the loose bracket and return the microtome 104 to normal operations conditions (e.g. the speed the chuck is driven may be adjusted to compensate for the negative effects of the loose bracket). That is, the system can output a control signal to compensate for the cause of the microtome not operating under normal conditions. In some embodiments, the intervention can be automated, such as, for example, where the control system may adjust the speed of sectioning of the tissue sample to correct for the identified malfunction. The control signal can be to adjust the speed, movement, or any other operational parameters of one or more components of the microtome 104.

In the step 1032, the system can output a signal as an alert to a user. In some embodiments, the alert may be generated even when automated control is taken by the system, as described above in the step 1030. For instance, the alert can be to notify a user that a corrective or compensatory action was taken by the automated system. In some embodiments, as an example, if a system based on the high-speed camera 215 output determines that the tissue block has exceeded an acceptable displacement value when the microtome blade 270 has engaged the block, the system 100 can output an alert to a user of the device to cease the operation if the deviation is large enough. In some embodiments, the system can output an alert to a user for manual adjustment of the one or more components of the system 100 and/or microtome 104 based on any baseline data being drifted from or exceeded.

In the step 1034, the control system may automatically output a control signal to cease operation of the microtome 104. The signal can be generated when the sensed data indicates the microtome is not in normal conditions or drifting from normal conditions. In some embodiments, the signal can be generated when the sensed data exceeds a limit of the baseline data by a certain amount. In some embodiments, the signal can be generated when a rate of drift in the data exceeds a certain rate. In some embodiments, the system may cease operation in the step 1034 and simultaneously output an alert to a user in the step 1032, indicating to the user that operation was ceased. The system may cease operation until a human user can correct the underlying issue.

The data and control signals relating to the method of FIG. 6 can be communicated via a wired, or wireless, connection between the sensors, the computing device, and one or more components of the system 100 and/or microtome 104 (e.g. actuators).

In some embodiments, the instant system can include an algorithm that may use data from one or more of the sensor outputs to reach a conclusion about the microtome 104 conditions and cut quality prediction. For example, if an image of the tissue quality control camera 115 shows blade serrations on a tissue sample or tissue block, the system can determine that the blade 270 should be changed. At the same, the force sensor 130a may be recording higher forces due to the same serrations or dulling of the blade 270. In another example, if a screw holding a piece of the microtome 104 is coming loose, the accelerometer 255, 265 on the microtome 104 can start recording high frequency vibrations that were not present in the past recordings. The algorithm can use a decision tree to come to a conclusion based on data from multiple sensors. For example, the algorithm can alter dynamic parameters and configuration of one of the chuck 250 and the blade 270 or blade holder 260 to correct or compensate for drifting in monitored microtome 104 conditions (i.e. if the microtome condition is drifting from normal to outside of normal). The algorithm can accomplish these alterations without human intervention but may alert a user after completion of a given cut.

In generally, as shown in FIG. 9, the system can be employed to determine baseline data from one or more of the above-mentioned sensors (such as, for example, the sensors 130a, 130b, 255, 265 and cameras 215, 115, described above). For instance, in a first step 1100, a controller of the system can receive data from one or more of the above-mentioned sensors when sectioning a tissue block, for instance. As discussed above, the received data can relate to the dynamics of one or more portions of the chuck assembly 251, the dynamics of a tissue block received in the chuck 250, the dynamics of one or more portions of the cutting assembly 252, and/or characteristics of a tissue section on a transport medium or slide. As discussed above, the received data can relate to the static orientation of the tissue block, portion of the cutting assembly 252, and/or portion of the chuck assembly 252.

In a second step, 1110, the controller can determine baseline data for the chuck assembly 251 and/or the cutting assembly 252 based on the received data. As discussed in greater detail below, with respect to FIGS. 8A-8E, the controller can determine a certain subset of the received data is baseline data. The baseline data can be determined from received data that relates to cutting tissue sections from a tissue block, where the tissue sections include the full cross section of the tissue sample embedded in the tissue block. In other words, received data that relates to facing the tissue block or removing slices of the tissue block until the full cross section of the embedded tissue sample is exposed, may not be incorporated into the determined baseline data.

In a third step 1120, the controller can compare subsequent sectioning data to the baseline data. In some embodiments, the subsequent sectioning data can relate to subsequent tissue sections removed from the same tissue block that the system determined the baseline data from. In some embodiments, the subsequent sectioning data can relate to subsequent tissue section from a second tissue block different from the tissue block the system determined baseline data from. The comparison can resemble that discussed with respect to the step 1020 of FIG. 6.

In a fourth step 1130, the controller of the system can determine whether the microtome 104, or one or more components of the chuck assembly 251 and/or the cutting assembly 252, are behaving normally based on the comparison in the step 1120. If it is determined that the microtome 104 is not behaving normally, the controller can create any of the outputs discussed with respect to the steps 1030, 1032, and 1034 of FIG. 6.

Figure 8A:
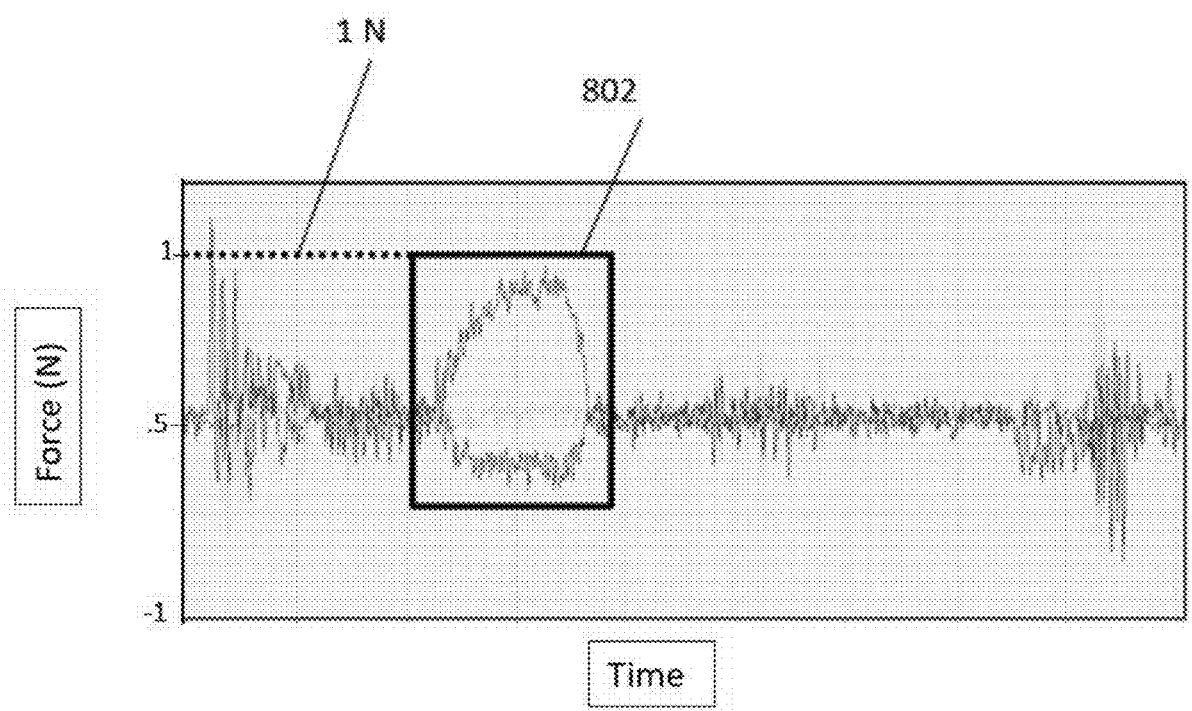
FIGS. 8A-8E are exemplary data of force measurements while slicing a tissue block.
Figure 8B:
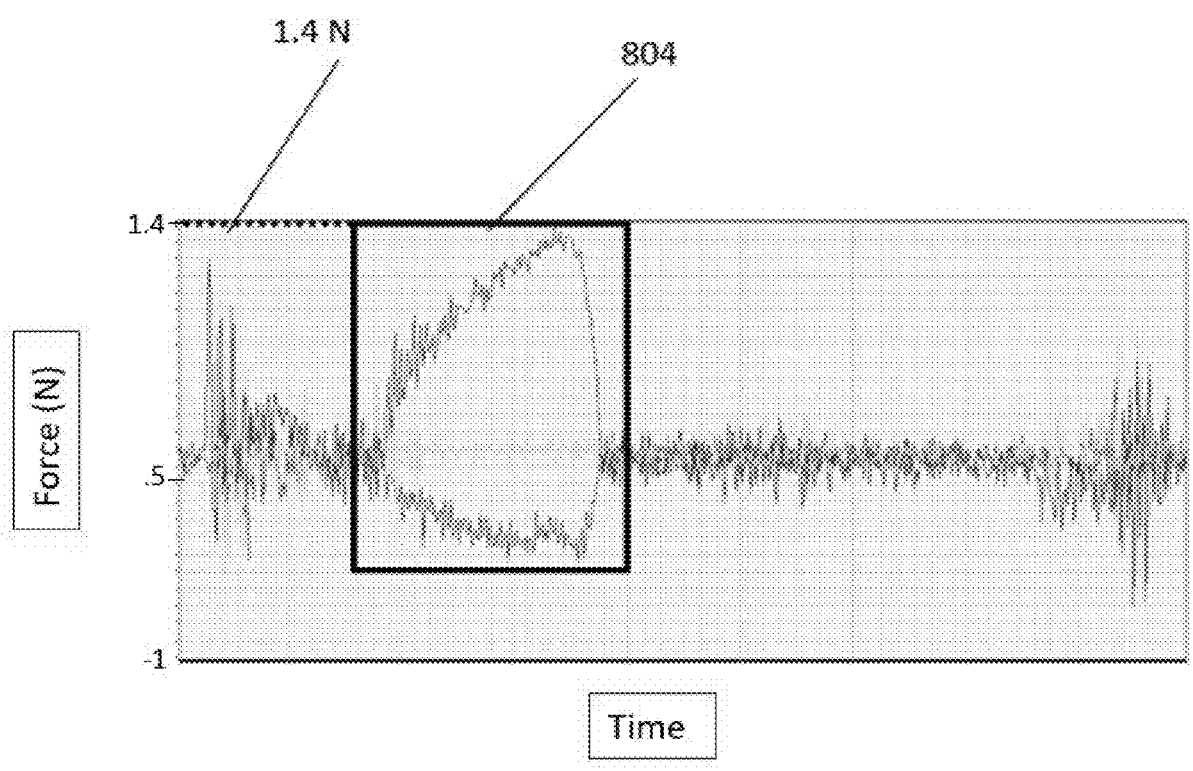
Figure 8C:
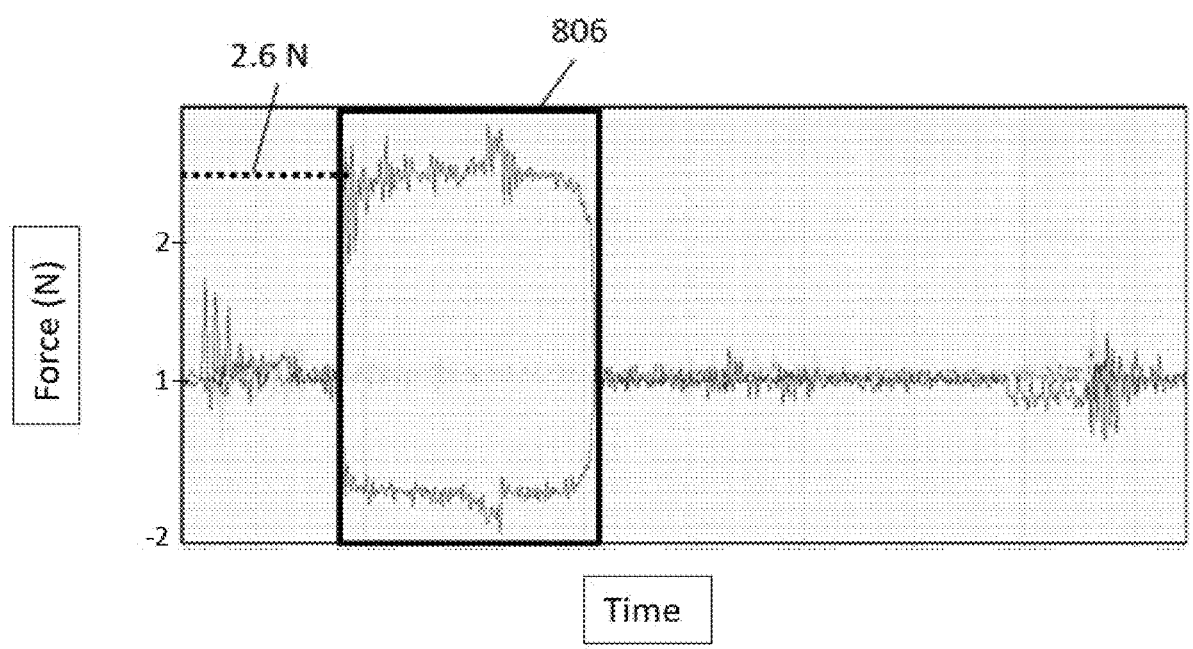
Figure 8D:
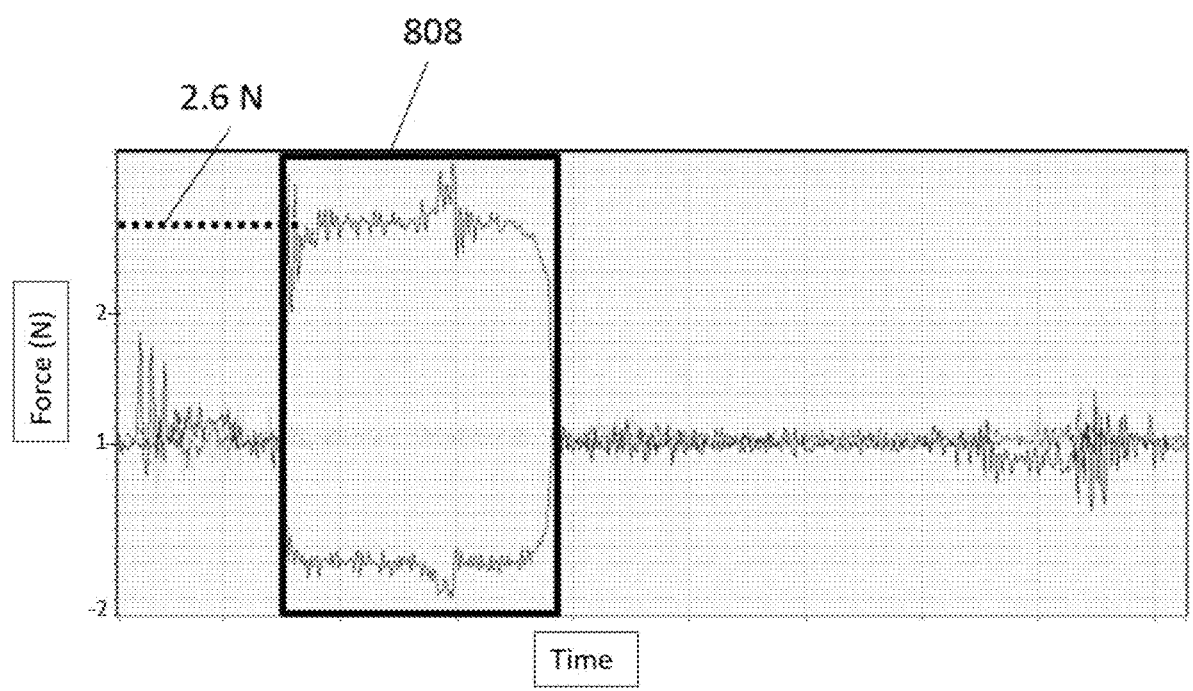

Referring to FIGS. 8A-8E, example force data from the one or more sensors described above while a tissue block is faced and sectioned is depicted. The Y axis in the depicted graphs is force in Newtons, acting on the chuck 250 or other part of the microtome 104, for instance. The X axis is time. The slices of the tissue block can be taken 20 µm thick and cut at a speed of 100 µm/sec, for instance. FIG. 8A depicts the fourth cut of the tissue block, measured from the initial facing cut of the tissue block. As the blade 270 only encounters a small portion of the embedded tissue sample (i.e. the blade 270 is not yet slicing through a full cross section of the tissue sample), the dynamic profile of the microtome 104 in the slicing window 802 (i.e. the period of time the blade is slicing through the tissue block) is defined by a maximum force of roughly 1 N. FIG. 8B depicts the ninth cut of the tissue block, measured from the initial facing cut of the tissue block. As the blade 270 encounters a larger portion of the embedded tissue sample than in the fourth cut, the dynamic profile of the microtome 104 in the slicing window 804 is defined by a maximum force of roughly 1.4 N. The profile or shape of the forces in the slicing window 804 differs from that of the forces in the slicing window 802. FIG. 8C depicts the forty-third cut of the tissue block, measured from the initial facing cut of the tissue block. As the blade 270 encounters the full cross section of the embedded tissue sample, the dynamic profile of the microtome 104 in the slicing window 806 is defined by a maximum force of roughly 2.6 N. The profile or shape of the forces in the slicing window 806 differs from those in the slicing windows 802 and 804. FIG. 8D depicts the forty-fourth cut of the tissue block, measured from the initial facing cut of the tissue block. As the blade 270 encounters the full cross section of the embedded tissue sample, the dynamic profile of the microtome 104 in the slicing window 808 is defined by a maximum force of roughly 2.6 N. The profile or shape of the forces in the slicing window 808 differs from those in the slicing windows 802 and 804. The profile or shape of the forces in the slicing window 808 resembles that of the forces in the slicing window 806.

Figure 8E:
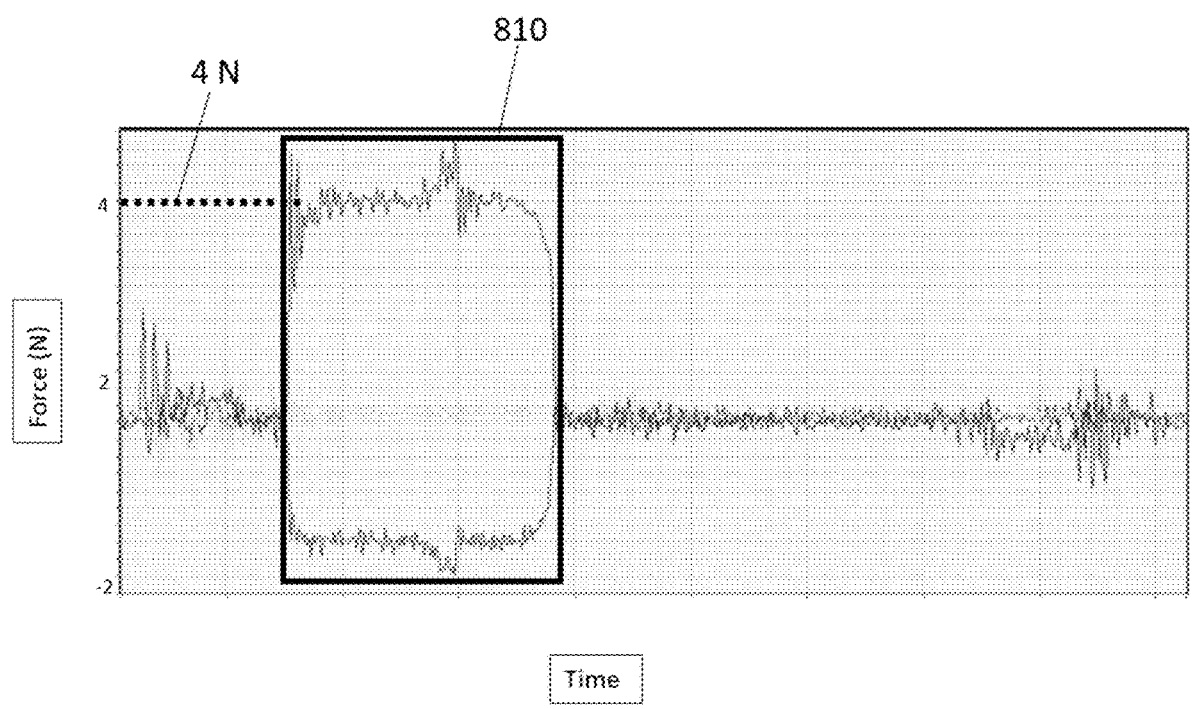
Figure 9:
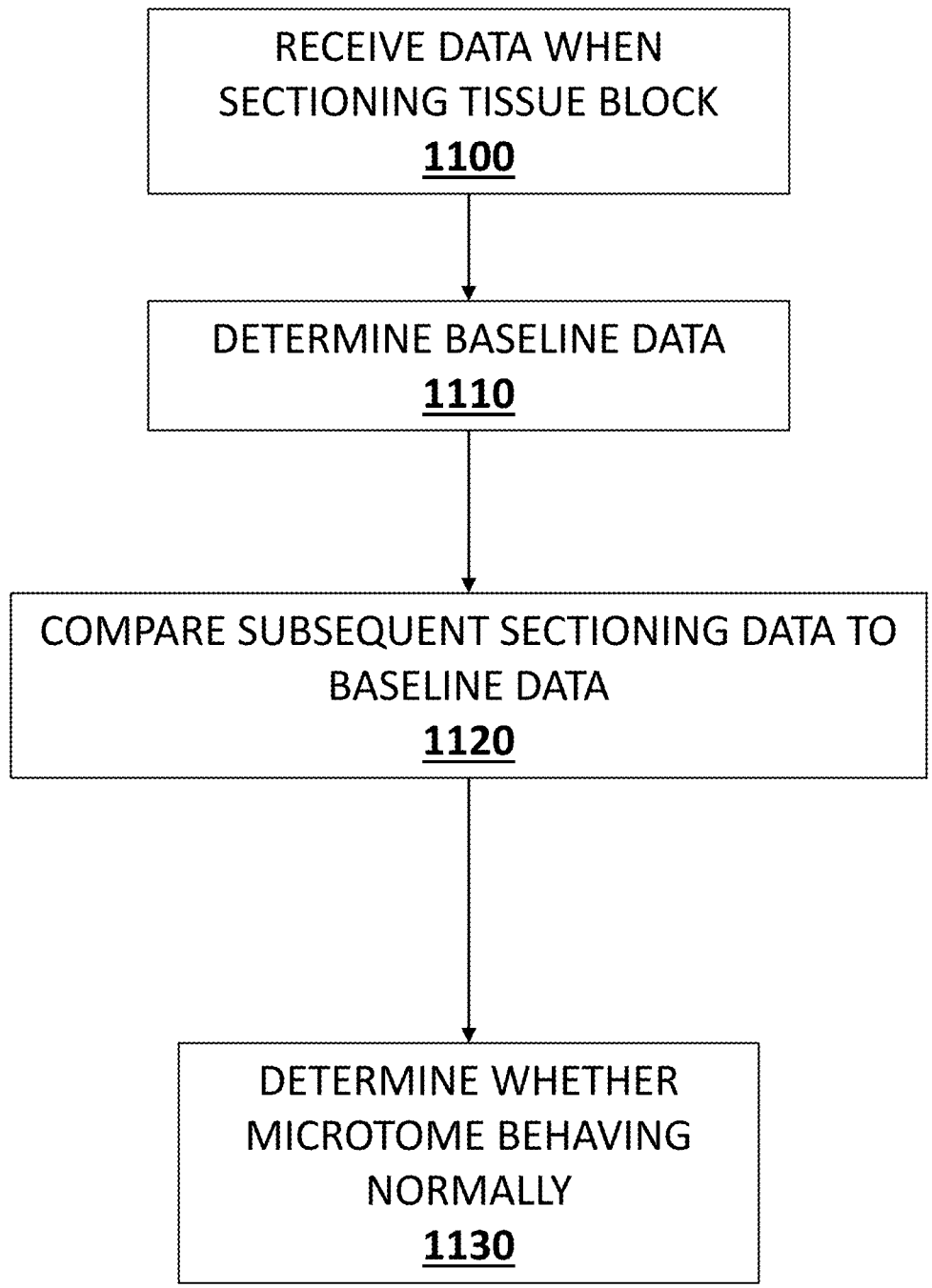
FIG. 9 is a flow chart illustration of a sample method of operation in accordance with some embodiments of the present disclosure.

Baseline data can be generated from the slicing window 806 and/or 808, which generally show that as the blade 270 slices through a full cross section of the tissue sample of the tissue block, the dynamic profile of forces (i.e. the magnitude and shape of the curve) in the slicing window should remain relatively constant. If, during any subsequent slice through the full cross section of tissue sample, for instance, the dynamic profile of forces in the slicing window of the subsequent slice differs from that of the baseline, it can be determined that the microtome 104 is not operating under normal conditions. If, during any subsequent slice through the full cross section of tissue sample, for instance, the dynamic profile of forces in the slicing window of the subsequent slice begin to differ from that of the baseline, it can be determined that the microtome 104 is drifting away from normal operating conditions. For instance, FIG. 8E depicts the sixtieth cut of the tissue block, measured from the initial facing cut of the tissue block. As the blade 270 encounters the full cross section of the embedded tissue sample, the dynamic profile of the microtome 104 in the slicing window 810 is defined by a maximum force of roughly 4.0 N. Therefore, the dynamic profile of the microtome 104 when making the sixtieth slice is outside the baseline data determined from and depicted in FIGS. 8C and 8D, for instance, indicating the microtome 104 is no longer behaving normally. The dynamic profile of forces in a subsequent slice may differ from the baseline data in terms of force magnitude, the shape of the force plot in the slicing window under inspection, or the size of slicing window (e.g. the length of time required to complete a cut of the tissue block).

Any suitable computing device can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1300 is depicted in FIG. 7. The computing device 1300 is merely an illustrative example of a suitable computing environment and in no way limits the scope of the present disclosure. A "computing device," as represented by FIG. 7, can include a "workstation," a "server," a "laptop," a "desktop," a "hand-held device," a "mobile device," a "tablet computer," or other computing devices, as would be understood by those of skill in the art. Given that the computing device 1300 is depicted for illustrative purposes, embodiments of the present disclosure may utilize any number of computing devices 1300 in any number of different ways to implement a single embodiment of the present disclosure. Accordingly, embodiments of the present disclosure are not limited to a single computing device 1300, as would be appreciated by one with skill in the art, nor are they limited to a single type of implementation or configuration of the example computing device 1300.

The computing device 1300 can include a bus 1310 that can be coupled to one or more of the following illustrative components, directly or indirectly: a memory 1312, one or more processors 1314, one or more presentation components 1316, input/output ports 1318, input/output components 1320, and a power supply 1324. One of skill in the art will appreciate that the bus 1310 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 7 is merely illustrative of an exemplary computing device that can be used to implement one or more embodiments of the present disclosure, and in no way limits the disclosure.

The computing device 1300 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1300.

The memory 1312 can include computer-storage media in the form of volatile and/or nonvolatile memory. The memory 1312 may be removable, non-removable, or any combination thereof. Exemplary hardware devices are devices such as hard drives, solid-state memory, optical-disc drives, and the like. The computing device 1300 can include one or more processors that read data from components such as the memory 1312, the various I/O components 1316, etc. Presentation component(s) 1316 present data indications to a user or other device. Exemplary presentation components include a display device, speaker, printing component, vibrating component, etc. The computing device 1300 can include one or more processors 1314 configured to execute instructions encoded on at least one non-transitory computer-readable storage medium. Execution of the instructions encoded on the at least one non-transitory computer-readable storage medium can cause the one or more processors 1314 to carry out one or more above the above-described methods.

The I/O ports 1318 can enable the computing device 1300 to be logically coupled to other devices, such as I/O components 1320. Some of the I/O components 1320 can be built into the computing device 1300. Examples of such I/O components 1320 include a microphone, joystick, recording device, game pad, satellite dish, scanner, printer, wireless device, networking device, and the like.

In some embodiments, a microtomy system is provided including a sectioning device including one or more components, the section device is configured to receive a sample and configured to cut a section from the sample. The microtomy system additionally includes at least one sensor configured to sense data regarding dynamics of the one or more components of the sectioning device and a control system. The control system is configured to receive data from the at least one sensor and to determine if the data from the at least one sensor shows nominal or non-nominal behavior of the one or more components and rectifying a source of the non-nominal behavior with human or automated intervention. In some aspects, the techniques described herein relate to a microtomy system for controlling tissue section quality, the system including, a tissue chuck configured to retain a tissue block therein; a microtome configured to cut tissue sections from the tissue block; at least one sensor configured to sense dynamics of one of the tissue chuck and the microtome; and a control system configured to receive sensed data from the at least one sensor and when the sensed data exceeds a predefined maximum or minimum value output one of an alert to a user, suspend operation of the robotic microtomy system, and adjust an operational parameter of the microtomy system. In some aspects, the techniques described herein relate to a microtomy system for controlling tissue section quality, wherein one of the at least one sensors is a camera, and wherein the camera includes a lens and a sensor that captures images or a live feed image data to monitor the tissue thickness in real time and the control system is configured to adjust an operational parameter of the microtomy system as a function of the captured images or the live feed image data. In some aspects, the techniques described herein relate to a microtomy system for controlling tissue section quality, wherein one of the sensors in the system is a camera, and wherein the includes a lens, a sensor, and a dedicated illumination system that provides illumination at various wavelengths to capture images or live feed data and the control system is configured to monitor the performance of the system as a function of the captured images or live feed data. In some aspects, the techniques described herein relate to a sectioning system for monitoring health of a microtome, the system including, a chuck for holding a sample; a microtome for cutting a portion of the sample; at least one sensor disposed on, or in communication with, the microtome; and a controller configured to monitor microtome health as a function of data from the at least one sensor. In some aspects, the techniques described herein relate to a robotic sectioning system for monitoring health, further including, an imaging system including a lens and an imaging sensor, the imaging sensor being configured to capture images and the controller being configured to analyze the captured images for blade artifacts and tissue thickness uniformity. In some aspects, the techniques described herein relate to a sectioning system for monitoring tissue section quality, the system including, a chuck for holding a sample of tissue; a microtome for cutting a tissue section from the sample; at least one sensor in communication with the microtome; and a controller configured to monitor microtome health as a function of data from the at least one sensor and to predict tissue section quality as a function of the monitored microtome health. In some aspects, the techniques described herein relate to a sectioning system, wherein the robotic sectioning system is configured to alter motion parameters and configuration of one of the chuck and the microtome to compensate for drifting monitored microtome health from the at least one sensor without user intervention. In some aspects, the techniques described herein relate to a robotic section system, wherein at least one of the sensors is a camera including a lens and a sensor, the sensor is configured to capture images or live feed data, the controller is configured to predict tissue section quality as a function of the captured images or the live feed data. In some aspects, the techniques described herein relate to a robotic section system, further including a duality of illumination configured to illuminate the sample of tissue at various wavelengths and the controller is configured to monitor the microtome health without user intervention.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification, embodiments have been described in a way which enables a clear and concise specification to be written, but it is intended and will be appreciated that embodiments may be variously combined or separated without parting from the scope of the present disclosure. It is intended that the present disclosure be limited only to the extent required by the appended claims and the applicable rules of law.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

It is also to be understood that the following claims are to cover all generic and specific features of the disclosure described herein, and all statements of the scope of the disclosure which, as a matter of language, might be said to fall therebetween.

What is claimed is:
1. A sectioning system comprising:
a chuck assembly configured to receive a tissue block;
a cutting assembly configured to remove a tissue section from the tissue block;

at least one sensor configured to sense data regarding dynamics of one or more components of at least one of the chuck assembly or the cutting assembly; and
a control system configured to:
receive data from the at least one sensor;
determine whether the data from the at least one sensor shows normal behavior of the one or more components of at least one of the chuck assembly or the cutting assembly; and
output a signal if it is determined the data from the at least one sensor does not show normal behavior of the one or more components, wherein:
the at least one sensor comprises a force sensor;
the force sensor is configured to collect vibration data from the sectioning system; and
the control system is configured to monitor performance of the sectioning system as a function of the vibration data.

2. The sectioning system of claim 1, wherein the signal is a control signal to one or more components of at least one of the chuck assembly or the cutting assembly to adjust an operational parameter of the one or more components.

3. The sectioning system of claim 1, wherein the signal is an alert to a user.

4. The sectioning system of claim 1, wherein the signal is a control signal to suspend operation of the sectioning system.

5. The sectioning system of claim 1, wherein the control system is configured to:
receive the data from the at least one sensor; and
determine the data does not show normal behavior of the one or more components when the data exceeds a predefined limit of baseline data indicative of normal behavior of the one or more components.

6. The sectioning system of claim 1, wherein the control system is configured to:
determine if the dynamics of the one or more components exceed a predetermined threshold within a chosen frequency band; and
output a signal to rectify a source of the dynamics that exceed the predetermined threshold.

7. The sectioning system of claim 1,
wherein the at least one sensor comprises a camera including an image sensor configured to capture at least one of a still image, video, or high speed image, and the data comprises at least one of a still image, video, or high speed image.

8. The sectioning system of claim 1, further comprising:
a motor configured to excite at least one of the chuck assembly or the cutting assembly with a predefined vibration signal,
wherein the control system is configured to measure data with the at least one sensor to obtain baseline data of at least one of the chuck assembly or the cutting assembly.

9. The sectioning system of claim 1, wherein the at least one sensor further comprises one or more of an image sensor, a video sensor, a highspeed image sensor, a laser Doppler vibrometer, or an acoustic sensor.

10. A sectioning system comprising:
a chuck assembly configured to receive a tissue block;
a cutting assembly configured to remove a tissue section from the tissue block;
at least one sensor configured to sense data regarding dynamics of one or more components of at least one of the chuck assembly or the cutting assembly; and
a control system configured to:
receive data from the at least one sensor;
determine whether the data from the at least one sensor shows normal behavior of the one or more components of at least one of the chuck assembly or the cutting assembly; and
output a signal if it is determined the data from the at least one sensor does not show normal behavior of the one or more components, wherein:
the at least one sensor is configured to capture images or a live feed image data to monitor performance of the sectioning system as a function of the images or live feed image data and the control system is configured to adjust an operational parameter of at least one of the chuck assembly or the cutting assembly as a function of the images or the live feed image data.

11. A sectioning system comprising:
a chuck assembly configured to receive a tissue block;
a cutting assembly configured to remove a tissue section from the tissue block;
at least one sensor configured to sense data regarding dynamics of one or more components of at least one of the chuck assembly or the cutting assembly; and
a control system configured to:
receive data from the at least one sensor;
determine whether the data from the at least one sensor shows normal behavior of the one or more components of at least one of the chuck assembly or the cutting assembly; and
output a signal if it is determined the data from the at least one sensor does not show normal behavior of the one or more components, wherein:
the at least one sensor is an image sensor, and the sectioning system further comprises an illumination system that provides illumination at various wavelengths to capture, by the image sensor, images or live feed data, and the control system is configured to monitor performance of the sectioning system as a function of the images or live feed data.

12. A sectioning system comprising:
a chuck assembly configured to receive a tissue block;
a cutting assembly configured to remove a tissue section from the tissue block;
at least one sensor configured to sense data regarding dynamics of one or more components of at least one of the chuck assembly or the cutting assembly; and
a control system configured to:
receive data from the at least one sensor;
determine whether the data from the at least one sensor shows normal behavior of the one or more components of at least one of the chuck assembly or the cutting assembly; and
output a signal if it is determined the data from the at least one sensor does not show normal behavior of the one or more components, wherein:
the at least one sensor is disposed on, or in communication with, the cutting assembly; and
the control system is configured to monitor cutting assembly condition as a function of data from the at least one sensor.

13. The sectioning system of claim 12, wherein the control system is further configured to predict tissue section quality as a function of the monitored cutting assembly condition.

14. A sectioning system comprising:
a chuck assembly configured to receive a tissue block;
a cutting assembly configured to remove a tissue section from the tissue block;

at least one sensor configured to sense data regarding dynamics of one or more components of at least one of the chuck assembly or the cutting assembly;
a control system configured to:
  receive data from the at least one sensor;
  determine whether the data from the at least one sensor shows normal behavior of the one or more components of at least one of the chuck assembly or the cutting assembly; and
  output a signal if it is determined the data from the at least one sensor does not show normal behavior of the one or more components; and
an imaging system including a lens and an imaging sensor, the imaging sensor being configured to capture images and the control system being configured to analyze the images for blade artifacts and tissue section thickness uniformity.

15. A sectioning system comprising:
a chuck assembly configured to receive a tissue block;
a cutting assembly configured to remove a tissue section from the tissue block;
at least one sensor configured to sense data regarding dynamics of one or more components of at least one of the chuck assembly or the cutting assembly; and
a control system configured to:
  receive data from the at least one sensor;
  determine whether the data from the at least one sensor shows normal behavior of the one or more components of at least one of the chuck assembly or the cutting assembly; and
  output a signal if it is determined the data from the at least one sensor does not show normal behavior of the one or more components, wherein:
    the control system is configured to alter dynamic parameters and configuration of at least one of the chuck assembly or the cutting assembly, without user intervention, to compensate for drifting microtome conditions monitored from the data from the at least one sensor.

16. A sectioning system comprising:
a chuck assembly configured to receive a tissue block;
a cutting assembly configured to remove a tissue section from the tissue block;
at least one sensor configured to sense data regarding dynamics of one or more components of at least one of the chuck assembly or the cutting assembly; and
a control system configured to:
  receive data from the at least one sensor;
  determine whether the data from the at least one sensor shows normal behavior of the one or more components of at least one of the chuck assembly or the cutting assembly; and
  output a signal if it is determined the data from the at least one sensor does not show normal behavior of the one or more components, wherein:
the at least one sensor comprises a camera including a lens and a sensor, the sensor is configured to capture images or live feed data, and the control system is configured to predict tissue section quality as a function of the images or the live feed data.

17. A sectioning system comprising:
a chuck assembly configured to receive a tissue block;
a cutting assembly configured to remove a tissue section from the tissue block;
at least one sensor configured to sense data regarding dynamics of one or more components of at least one of the chuck assembly or the cutting assembly;
a control system configured to:
  receive data from the at least one sensor;
  determine whether the data from the at least one sensor shows normal behavior of the one or more components of at least one of the chuck assembly or the cutting assembly; and
  output a signal if it is determined the data from the at least one sensor does not show normal behavior of the one or more components; and
an illumination system configured to illuminate at least one of the chuck assembly or the cutting assembly at various wavelengths, wherein the control system is configured to monitor cutting assembly condition without user intervention.

18. A sectioning system comprising:
a tissue chuck configured to retain a tissue block therein;
a blade configured to cut tissue sections from the tissue block;
at least one sensor configured to sense dynamics of at least one of the tissue chuck or the blade; and
a control system configured to:
  receive sensed data from the at least one sensor;
  determine whether the sensed data exceeds a predefined limit of baseline data; and
  output a signal if it is determined the sensed data exceeds the predefined limit of baseline data,
wherein:
the at least one sensor comprises a force sensor;
the force sensor is configured to collect vibration data from the sectioning system; and
the control system is configured to monitor performance of the sectioning system as a function of the vibration data.

19. The sectioning system of claim 18, wherein:
the at least one sensor comprises a laser Doppler vibrometer;
the laser Doppler vibrometer is configured to collect vibration data from the sectioning system; and
the control system is configured to monitor performance of the sectioning system as a function of the vibration data.

20. A sectioning system comprising:
a tissue chuck configured to retain a tissue block therein;
a blade configured to cut tissue sections from the tissue block;
at least one sensor configured to sense dynamics of at least one of the tissue chuck or the blade; and
a control system configured to:
  receive sensed data from the at least one sensor;
  determine whether the sensed data exceeds a predefined limit of baseline data; and
  output a signal if it is determined the sensed data exceeds the predefined limit of baseline data,
wherein:
the at least one sensor comprises a camera;
the camera includes a lens, a sensor, and a dedicated illumination system that provides illumination at various wavelengths to capture images or live feed data; and
the control system is configured to monitor performance of the sectioning system as a function of the images or live feed data.

* * * * *